(12) United States Patent
Taniguchi et al.

(10) Patent No.: US 7,309,736 B2
(45) Date of Patent: *Dec. 18, 2007

(54) ACRYLIC BLOCK COPOLYMER AND THERMOPLASTIC RESIN COMPOSITION

(75) Inventors: Akio Taniguchi, Osaka (JP); Tadashi Kokubo, Osaka (JP); Kentaro Takesada, Osaka (JP); Kozo Kondo, Hyogo (JP); Takeshi Chiba, Hyogo (JP); Atsushi Kumasaki, Osaka (JP); Yutaka Kaneda, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/522,869

(22) PCT Filed: Jul. 31, 2003

(86) PCT No.: PCT/JP03/09721

§ 371 (c)(1),
(2), (4) Date: Jan. 28, 2005

(87) PCT Pub. No.: WO2004/013192

PCT Pub. Date: Feb. 12, 2004

(65) Prior Publication Data

US 2005/0234199 A1 Oct. 20, 2005

(30) Foreign Application Priority Data

Aug. 2, 2002 (JP) .............................. 2002-226304
Sep. 30, 2002 (JP) .............................. 2002-285724

(51) Int. Cl.
*C08L 53/00* (2006.01)
(52) U.S. Cl. .................... 525/88; 525/92 B; 525/92 E; 525/92 F; 525/94
(58) Field of Classification Search .............. 525/92 B, 525/92 E, 92 F, 94, 88
See application file for complete search history.

(56) References Cited

U.S. PATENT DOCUMENTS

| | | | | |
|---|---|---|---|---|
| 4,925,765 A * | 5/1990 | Madeleine | ............. | 430/108.22 |
| 5,218,053 A | 6/1993 | DuBois | | |
| 5,314,962 A | 5/1994 | Otsu et al. | | |
| 5,403,658 A * | 4/1995 | Southwick et al. | ... | 428/355 BL |
| 7,067,586 B2 * | 6/2006 | Liu et al. | ..................... | 525/242 |
| 2001/0044024 A1* | 11/2001 | Miyashita et al. | ....... | 428/355 R |
| 2002/0193538 A1* | 12/2002 | Matyjaszewski et al. | ... | 526/172 |
| 2004/0096411 A1* | 5/2004 | Frechet et al. | ........... | 424/70.11 |
| 2004/0147674 A1* | 7/2004 | Kakeda et al. | ................. | 525/88 |
| 2004/0204556 A1* | 10/2004 | Matyjaszewski et al. | | 526/329.7 |
| 2005/0085592 A1* | 4/2005 | Taniguchi et al. | .......... | 525/242 |

FOREIGN PATENT DOCUMENTS

| | | |
|---|---|---|
| EP | 0 273 397 A2 | 7/1988 |
| EP | 0 273 397 A3 | 7/1988 |
| EP | 0 318 197 A2 | 5/1989 |
| EP | 0 318 197 A3 | 5/1989 |
| EP | 0 942 018 A1 | 9/1999 |
| JP | 3-205407 A | 9/1991 |
| JP | 9-277464 A | 10/1997 |
| JP | 2002-284816 A | 10/2002 |
| JP | 2002-293835 A | 10/2002 |

OTHER PUBLICATIONS

Kazuhiko et al., electronic translation of JP 11-349782, Dec. 1999.*
Chiba, DERWENT abstract ACC-NO 2003-120654.*
International Search Report from Corresponding International Application No. PCT/JP03/09721, dated Nov. 18, 2003, 2 pages.
Supplementary European Search Report from Application No. EP 03 76 6671, Dec. 2, 2005, 3 pages.

* cited by examiner

*Primary Examiner*—Jeffrey Mullis
(74) *Attorney, Agent, or Firm*—Brinks Hofer Gilson & Lione

(57) ABSTRACT

The present invention provides a novel acrylic block copolymer rich in flexibility and excellent in mechanical strength, moldability, oil resistance, heat resistance, thermal decomposition resistance, weather resistance, and compression set, and further rich in reactivity. The present invention also provides compositions, seal products, and automobile, electric, and electronic parts, all of which include the acrylic block copolymer. The acrylic block copolymer includes a methacrylic polymer block (a) and an acrylic polymer block (b), at least one of the polymer blocks containing, in its main chain, at least one acid anhydride group (c) represented by formula (1):

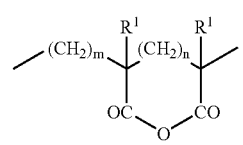

(1)

(wherein $R^1$'s each represent hydrogen or a methyl group and may be the same or different, n represents an integer of 0 to 3, and m represents an integer of 0 or 1).

10 Claims, No Drawings

ACRYLIC BLOCK COPOLYMER AND THERMOPLASTIC RESIN COMPOSITION

RELATED APPLICATIONS

This application is a nationalization of PCT application PCT/JP2003/009721 filed on Jul. 31, 2003, claiming priority to Japanese Application No. 2002-226304 filed on Aug. 2, 2002, and Japanese Application No. 2002-285724 filed on Sep. 30, 2002.

1. Technical Field

The present invention relates to nonconventional acrylic block copolymers and compositions which are rich in flexibility and excellent in mechanical strength, moldability, oil resistance, heat resistance, thermal decomposition resistance, weather resistance, and compression set, and is further rich in reactivity.

The present invention also relates to seal products for automobiles, home electric appliances, or office electric appliances, and automobile, electric, and electronic parts all of which are produced using the acrylic block copolymers or compositions comprising the acrylic block copolymers.

The present invention further relates to a process for producing the acrylic block copolymers.

2. Background Art

Although vulcanized rubber has excellent flexibility and excellent rubber elasticity, rubber must be mixed with an additive and vulcanized in molding to increase the molding cycle time and complicate the molding process, thereby causing a problem of moldability. Also, vulcanized rubber is disadvantageous in that it is not melted even by reheating after molding and vulcanization, and thus it cannot be post-processed by bonding or the like and is difficult to recycle after use.

From this viewpoint, in recent years, thermoplastic elastomers have been increasingly used in place of vulcanized rubber. For example, in automobile vehicles, various seal parts such as glass run channels, weatherstrips, various boots, draining moldings, and the like are used. These parts are mostly made of vulcanized rubber, but lightweight and recyclable olefinic thermoplastic elastomers have been recently brought into use for some of the seal parts from the viewpoint of improvement in fuel consumption and environmental problems.

A thermoplastic elastomer generally has an alloy structure comprising a rubber component (soft segment) exhibiting entropy elasticity, and a restrictive component (hard segment) which flows at high temperatures but inhibits plastic deformation at room temperature to give a reinforcing effect to the rubber component. For example, in a styrenic elastomer, a styrene block aggregates and functions as a hard segment, and a butadiene block or an isoprene block forms a matrix and functions as a soft segment. An olefinic elastomer has an alloy structure in which rubber such as ethylene-propylene-diene copolymer rubber (EPDM) or the like is dispersed in a polypropylene (PP) resin or the like. Any type of thermoplastic elastomer can be thermoplastically processed by injection molding or the like because the hard segment flows at high temperatures. However, conventional styrenic or olefinic thermoplastic elastomers are disadvantageous in that they have insufficient rubber elasticity and heat resistance (corresponding to compression set characteristics at high temperatures) in comparison to vulcanized rubber, and also have low oil resistance. On the other hand, as thermoplastic elastomers having excellent oil resistance, acrylic block copolymers having methacrylic blocks and acrylic blocks have been recently disclosed, as disclosed in Japanese Patent No. 2,553,134. Like the styrenic elastomers, these elastomers have excellent moldability, but have the disadvantage that they have low heat resistance. Also, the hard segments of thermoplastic elastomers flow at high temperatures, and thus the thermoplastic elastomers can be thermoplastically processed. However, when the thermal decomposition temperatures of the thermoplastic elastomers are lower than injection molding temperatures, the thermoplastic elastomers thermally deteriorate in some cases. Particularly, methacrylic polymers are often decomposed to monomers at 170° C. to 250° C. by depolymerization (Polymer Handbook Third Edition: Wiley-Interscience 1989). When high-temperature heat stability is required, therefore, these polymers cannot be used disadvantageously.

On the other hand, it has been known that thermoplastic elastomers are added for modifying resins, for example, improving the impact resistance of thermoplastic resins, or compounded as soft materials with thermoplastic resins (refer to, for example, Japanese Unexamined Patent Application Publication No. 10-279738). The styrenic elastomers and olefinic elastomers are nonpolar resins and thus can be used for modifying other nonpolar resins. However, the elastomers are poor in compatibility with polar resins, and thus compatibilizers must be added for modifying polar resins, or compounds such as maleic anhydride or the like must be added as grafts to thermoplastic elastomers, for modifying the elastomers (refer to, for example, Japanese Unexamined Patent Application Publication Nos. 7-173390 and 2000-265033). In this case, modification can be made, but oil resistance deteriorates due to the characteristics of the styrenic or olefinic thermoplastic elastomers. Although the above-described acrylic block copolymers have higher oil resistance and compatibility than those of the styrenic or olefinic thermoplastic elastomers, the oil resistance and compatibility are still at insufficient levels. There is thus demand for development of thermoplastic elastomers excellent in oil resistance, heat resistance, and thermal decomposition resistance, and also excellent for modification of thermoplastic resins and excellent in compounding characteristics.

Examples of conventional materials having oil resistance, heat resistance, and rubber elasticity include nitrile rubber (NBR), acrylic rubber (ACM), silicone rubber (VMQ), and chloroprene rubber (CR). These materials are used for seal products for automobiles, seal products for home electric appliances, seal products for office electric appliances, and automobile, electric, and electronic parts, etc. However, as described above, kneaded products prepared by kneading mixtures with additives must be supplied into molds and then vulcanized, thereby necessitating a special molding machine, increasing the molding cycle time, and complicating the molding process. Therefore, promising thermoplastic elastomers are desired.

DISCLOSURE OF INVENTION

An object of the present invention is to provide a novel acrylic block copolymer rich in flexibility and excellent in mechanical strength, moldability, oil resistance, heat resistance, thermal decomposition resistance, weather resistance, and compression set, and also rich in reactivity, and a process for producing the acrylic block copolymer.

Another object of the present invention is to provide the acrylic block copolymer, and compositions, seal products for automobiles, seal products for home electric appliances, seal products for office electric appliances, and automobile, electric, and electronic parts, each of which comprises the acrylic block copolymer.

As a result of studies for solving the above-described problems, it was found that an acrylic block copolymer comprising a methacrylic polymer block (a) and an acrylic polymer block (b), at least one of the polymer blocks containing a specified acid anhydride group in its main chain, is rich in flexibility and excellent in mechanical strength, moldability, oil resistance, heat resistance, thermal decomposition resistance, and compression set, and is further rich in reactivity. This finding resulted in the completion of the present invention.

Namely, the present invention relates to an acrylic block copolymer comprising a methacrylic polymer block (a) and an acrylic polymer block (b), at least one of the polymer blocks containing, in its main chain, at least one acid anhydride group (c) represented by formula (1):

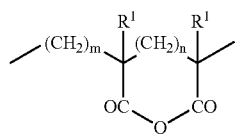

(1)

(wherein $R^1$s each represent a hydrogen atom or a methyl group and may be the same or different, n represents an integer of 0 to 3, and m represents an integer of 0 or 1).

The acrylic block copolymer preferably contains 0.1% by weight to 50% by weight of a carboxyl group (d).

The acrylic block copolymer is preferably of at least one type selected from the group consisting of $(a-b)_n$, $b-(a-b)_n$, and $(a-b)_n-a$.

The acrylic block copolymer preferably has a number-average molecular weight of 30,000 to 500,000.

The acrylic block copolymer preferably has a ratio (Mw/Mn) of 1 to 1.8 of the weight-average molecular weight (Mw) to the number-average molecular weight (Mn) according to gel permeation chromatographic measurement.

The acrylic block copolymer preferably comprises 5% by weight to 80% by weight of the methacrylic polymer block (a) and 95% by weight to 20% by weight of the acrylic polymer block (b).

The methacrylic polymer block (a) preferably contains the acid anhydride group (c).

The acrylic polymer block (b) preferably contains the acid anhydride group (c).

The content of the acid anhydride group (c) is preferably 0.1% by weight to 99.9% by weight of the whole of the acrylic block copolymer (A).

The carboxyl group (d) is preferably contained in the block containing the acid anhydride group (c).

The acrylic polymer block (b) preferably comprises 50% by weight to 100% by weight of at least one acrylate selected from the group consisting of n-butyl acrylate, ethyl acrylate, and 2-methoxyethyl acrylate, and 0% by weight to 50% by weight of another acrylate and/or a vinyl monomer copolymerizable with the acrylate.

The acrylic polymer block (b) preferably comprises n-butyl acrylate, ethyl acrylate, and 2-methoxyethyl acrylate.

The acrylic polymer block (b) preferably comprises n-butyl acrylate and 2-methoxyethyl acrylate.

The acrylic polymer block (b) preferably comprises n-butyl acrylate and 2-ethylhexyl acrylate.

The acrylic block copolymer preferably contains a carboxyl group (e) produced in its side chains by hydrolytic ring opening of the acid anhydride group.

The acrylic block copolymer is preferably produced by atom transfer radical polymerization.

The present invention also relates to a composition comprising the acrylic block copolymer (A) and at least one selected from the group consisting of cross-linked rubber (B), a thermoplastic resin (C), a thermoplastic elastomer (D), a lubricant (E), an inorganic filler (F), and a stabilizer (G)

The composition preferably comprises 0.5% by weight to 99.5% by weight of the acrylic block copolymer (A), and 99.5% by weight to 0.5% by weight of the thermoplastic resin (C) and/or the thermoplastic elastomer (D) on the basis of the whole of the composition.

The thermoplastic resin (C) is preferably selected from the group consisting of a polyvinyl chloride resin, a polymethyl methacrylate resin, an acrylonitrile-styrene copolymer resin, a methyl methacrylate-styrene copolymer resin, a polycarbonate resin, a polyester resin, and a polyamide resin. The thermoplastic elastomer (D) is preferably selected from the group consisting of a styrene elastomer, an olefin elastomer, an urethane elastomer, a vinyl chloride elastomer, an amide elastomer, an ester elastomer, and an acryl elastomer.

The composition preferably contains 0.01 parts by weight to 50 parts by weight of the lubricant (E) and/or 0.01 parts by weight to 300 parts by weight of the inorganic filler (F) on the basis of 100 parts by weight of the acrylic block copolymer (A).

The acrylic block copolymer (A) preferably contains at least one acrylate unit selected from the group consisting of a n-butyl acrylate unit, an ethyl acrylate unit, and a 2-methoxyethyl acrylate unit.

The present invention further relates to a process for producing the acrylic block copolymer comprising melt-kneading an acrylic block copolymer (A') at a temperature of 180° C. to 300° C., the acrylic block copolymer (A') comprising a methacrylic polymer block (a) and an acrylic polymer block (b), at least one of the polymer blocks containing, in its main chain, at least one unit represented by formula (2):

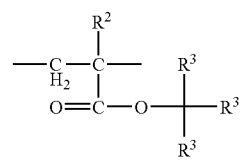

(2)

(wherein $R^2$ represents hydrogen or a methyl group, and $R^3$s each represent hydrogen, a methyl group, or a phenyl group, and may be the same or different as long as at least one $R^3$ is a methyl group).

The acrylic block copolymer (A') is preferably produced by controlled radical polymerization.

The acrylic block copolymer (A) is preferably melt-kneaded with water.

The present invention further relates to a seal product produced by molding the acrylic block copolymer (A).

The present invention further relates to a seal product comprising the composition.

The present invention further relates to an automobile, electric, or electronic part comprising the acrylic block copolymer (A).

BEST MODE FOR CARRYING OUT THE INVENTION

The present invention relates to an acrylic block copolymer (A) comprising a methacrylic polymer block (a) and an acrylic polymer block (b), at least one of the polymer blocks containing, in its main chain, at least one acid anhydride group (c) represented by formula (1):

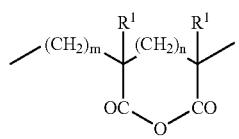
(1)

(wherein $R^1$s each represent a hydrogen atom or a methyl group and may be the same or different, n represents an integer of 0 to 3, and m represents an integer of 0 or 1).

The present invention will be described in detail below.

<Acrylic Block Copolymer (A)>

The acrylic block copolymer (A) of the present invention may have the structure of a linear block copolymer or a branched (star) block copolymer, or a mixture thereof. The structures of the block copolymer are properly used according to the required physical properties of the acrylic block copolymer (A) and the required processing properties and mechanical properties of a composition with cross-linked rubber (B) and a thermoplastic resin (C). However, in view of cost and polymerizability, a linear block copolymer is preferred.

The structure of the linear block copolymer is not particularly limited. From the viewpoint of the physical properties of the linear block copolymer or the physical properties of a composition, the acrylic block copolymer is preferably of at least one type selected from the group consisting of $(a-b)_n$, $b-(a-b)_n$, and $(a-b)_n-a$ (n is an integer of 1 or more, e.g., an integer of 1 to 3) wherein the methacrylic polymer block (a) is denoted by a, and the acrylic polymer block (b) is denoted by b. Although the type is not particularly limited, an (a-b)-diblock copolymer, an (a-b-a)-triblock copolymer, or a mixture thereof is preferred from the viewpoint of handleability in processing and the physical properties of compositions.

In the present invention, at least one acid anhydride group (c) is introduced into at least one of the methacrylic polymer block (a) and the acrylic polymer block (b). When two or more acid anhydride groups are introduced, polymerization of a monomer containing the acid anhydride group is random copolymerization or block copolymerization. For example, the type of a (a-b-a)-triblock copolymer may be any one of (a/z)-b-a, (a/z)-b-(a/z), z-a-b-a, z-a-b-a-z, a-(b/z)-a, a-b-z-a, a-z-b-z-a, (a/z)-(b/z)-(a/z), and z-a-z-b-z-a-z. In these expressions, z represents a monomer or polymer block containing the acid anhydride group (c), (a/z) represents copolymerization of the methacrylic polymer block (a) with a monomer containing the acid anhydride group (c), and (b/z) represents copolymerization of the acrylic polymer block (b) with a monomer containing the acid anhydride group (c).

In the methacrylic polymer block (a) or the acrylic polymer block (b), the segment and form in which z is contained may be freely determined according to purposes.

The number-average molecular weight of the acrylic block copolymer (A) is not particularly limited and may be determined according to the required molecular weights of the methacrylic polymer block (a) and the acrylic polymer block (b). When the molecular weight is small, the copolymer (A) may exhibit insufficient mechanical properties as an elastomer, while when the molecular weight is excessively large, processing characteristics may deteriorate. From this viewpoint, the number-average molecular weight of the acrylic block copolymer (A) is preferably 30,000 to 500,000, more preferably 40,000 to 400,000, and most preferably 50,000 to 300,000.

Although the ratio (Mw/Mn) of the weight-average molecular weight to the number-average molecular weight (Mn) of the acrylic block copolymer (A) according to gel permeation chromatographic measurement is not particularly limited, the ratio is preferably 1 to 1.8, and more preferably 1 to 1.5. With the ratio (Mw/Mn) over 1.8, the uniformity of the acrylic block copolymer may deteriorate.

The composition ratios of the methacrylic polymer block (a) and the acrylic polymer block (b) which constitute the acrylic block copolymer (A) are not particularly limited. The ratios may be determined according to the physical properties required for intended purposes, the moldability required for processing compositions, and the required molecular weights of the methacrylic polymer block (a) and the acrylic polymer block (b). For example, the composition ratios of the methacrylic polymer block (a) and the acrylic polymer block (b) are preferably 5% by weight to 80% by weight and 95% by weight to 20% by weight, more preferably 10% by weight to 70% by weight and 90% by weight to 30% by weight, and most preferably 10% by weight to 60% by weight and 90% by weight to 40% by weight, respectively. Particularly, the composition ratios of the methacrylic polymer block (a) and the acrylic polymer block (b) are preferably 20% by weight to 50% by weight and 80% by weight to 50% by weight, respectively. When the ratio of the methacrylic polymer block (a) is less than 5% by weight, rubber elasticity at high temperatures may decrease, while when the ratio exceeds 80% by weight, the mechanical properties of elastomers, particularly elongation at break, may decrease, or the flexibility of compositions with thermoplastic resins may decrease.

Assuming that the glass transition temperatures of the methacrylic polymer block (a) and the acrylic polymer block (b) which constitute the acrylic block copolymer (A) are $Tg_a$ and $Tg_b$, respectively, the glass transition temperatures of the methacrylic polymer block (a) and the acrylic polymer block (b) preferably satisfies the following relationship:

$$Tg_a > Tg_b$$

The glass transition temperature (Tg) of each of the polymers (the methacrylic polymer block (a) and the acrylic polymer block (b)) can be determined using the weight ratio of the monomer of each polymer according to the following Fox's equation.

$$1/Tg = (W_1/Tg_1) + (W_2/Tg_2) + \ldots + (W_m/Tg_m)$$

$$W_1 + W_2 + \ldots + W_m = 1$$

In the equation, Tg represents the glass transition temperature of a polymer, $Tg_1, Tg_2, \ldots, Tg_m$ each represent the glass transition temperature of a homopolymer of each monomer, and $W_1, W_2, \ldots, W_m$ each represent the weight ratio of each monomer.

As the glass transition temperature of each homopolymer in the above Fox's equation, for example, the value described in Polymer Handbook Third Edition (Wiley-Interscience 1989) may be used.

The glass transition temperature can be determined by DSC (differential scanning calorimetry) or a tan δ peak of dynamic viscoelasticity. However, when the polarities of the methacrylic polymer block (a) and the acrylic polymer block (b) are excessively close to each other, or when the number of the linked monomers is excessively small, the measured value may deviate from the value calculated according to the Fox's equation.

The acid anhydride group (c) represented by formula (1) may be introduced into the block copolymer by any desired method without limitation.

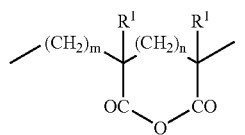

(1)

(wherein $R^1$s each represent hydrogen or a methyl group and may be the same or different, n represents an integer of 0 to 3, and m represents an integer of 0 or 1.) However, from the viewpoint of easy introduction and easy purification after introduction, the acid anhydride group (c) is preferably introduced in the form of a functional group as a precursor, for example, a form represented by formula (2), into the acrylic block copolymer (A) and then subjected to cyclization.

In formula (1), n is an integer of 0 to 3, preferably 0 or 1, and more preferably 1. When n is 4 or more, polymerization may be complicated, or cyclization of the acid anhydride group may be made difficult.

In formula (1), m is an integer of 0 or 1. When n is 0, m is preferably 0, and when n is 1 to 3, m is preferably 1.

The acid anhydride group (c) may be introduced in one or both of the methacrylic polymer block (a) and the acrylic polymer block (b). The acid anhydride group (c) may be introduced under preferred conditions according to purposes, i.e., according to the reactive site of the acrylic block copolymer (A), cohesive force and glass transition temperatures of the blocks (the methacrylic polymer block (a) and the acrylic polymer block (b)) which constitute the acrylic block copolymer (A), and the required physical properties of the acrylic block copolymer (A). For example, when the methacrylic polymer block (a) or the acrylic polymer block (b) is desired to be selectively modified or reacted with a compound having an amino group or hydroxyl group using the acid anhydride group as a reactive site, the acid anhydride group (c) may be introduced into a block which is desired to be modified or reacted. In view of improvement in the heat resistance and thermal decomposition resistance of the acrylic block copolymer (A), the acid anhydride group (c) may be introduced into the methacrylic polymer block (a). From the viewpoint that oil resistance, higher rubber elasticity, and compression set are imparted to the acrylic block copolymer (A), the acid anhydride group (c) may be introduced as a cross-linking reactive site (cross-linking point) into the acrylic polymer block (b). As a nonlimiting example, the acid anhydride group (c) is preferably introduced into any one of the methacrylic polymer block (a) and the acrylic polymer block (b) from the viewpoint of control of the reactive site, heat resistance, and rubber elasticity.

As a nonlimiting example, when the acid anhydride group (c) is introduced into the methacrylic polymer block (a), both $R^1$s in formula (1) are preferably methyl groups, and when the acid anhydride group (c) is introduced into the acrylic polymer block (b), both $R^1$s in formula (1) are preferably hydrogen atoms. Where both $R^1$s are hydrogen atoms when the acid anhydride group (c) is introduced into the methacrylic polymer block (a), and both $R^1$s are methyl groups when the acid anhydride group (c) is introduced into the acrylic polymer block (b), a polymerization operation for the acrylic block polymer (A) becomes complicated, and a difference between the glass transition temperatures of the methacrylic polymer block (a) and the acrylic polymer block (b) decreases, thus the rubber elasticity of the acrylic block copolymer (A) tends to decrease.

The preferred range of contents of the acid anhydride group (c) depends on the cohesive force and reactivity of the acid anhydride group (c), the structure and composition of the acrylic block copolymer (A), the number of the constituent blocks of the acrylic block copolymer (A), and the glass transition temperature thereof, and the introduction site and form of the acid anhydride group (c). For example, the content of the acid anhydride group (c) preferably ranges from 0.1% by weight to 99.9% by weight, and more preferably ranges from 0.5% by weight to 99.9% by weight, relative to the whole of the acrylic block copolymer (A). With the content of less than 0.1% by weight, the reactivity of the acrylic block copolymer (A) and compatibility with thermoplastic resins may become insufficient. When the acid anhydride group (c) having high Tg is introduced into the methacrylic polymer block (a) serving as the hard segment in order to improve the heat resistance and thermal decomposition resistance of the acrylic block copolymer (A), with the content of less than 0.1% by weight, the heat resistance and the thermal decomposition resistance may be not sufficiently improved to decrease the expression of rubber elasticity at high temperatures. On the other hand, with the content of over 99.9% by weight, the introduction may become difficult, and cohesive force may excessively increase, thereby degrading processability. When the acid anhydride group (c) is introduced into the acrylic polymer block (b) in order to impart oil resistance and rubber elasticity to the acrylic block copolymer (A), with the content of less than 0.1% by weight, the oil resistance and cohesive force are not sufficiently imparted, and reaction of the acid anhydride group (c) used as a reactive site becomes insufficient. Therefore, the rubber elasticity and compression set tend to deteriorate. On the other hand, with the content of over 99.9% by weight, the introduction tends to become difficult, and flexibility and mechanical properties tend to decrease.

The content of the acid anhydride group (c) is represented by percent by weight of a monomer unit originally containing the acid anhydride group (c) or a monomer unit having the acid anhydride group (c) produced by reaction or the like. The content can be determined by $^{13}C(^1H)$-NMR analysis.

The block containing the acid anhydride group (c) and the content of the acid anhydride group (c) may be appropriately determined according to the required cohesive force and glass transition temperature, compatibility with the cross-linking rubber (B), the thermoplastic resin (C) and/or the thermoplastic elastomer (D), and the reactive site.

From the viewpoint of further improvement in heat resistance and cohesive force, the acrylic block copolymer (A) may contain a carboxyl group (d). The carboxyl group (d) can be produced in the process for introducing the acid anhydride group (c) into the acrylic block copolymer (A).

The carboxyl group (d) may be introduced to only one or both of the methacrylic polymer block (a) and the acrylic polymer block (b). In view of the reactive site of the acrylic block copolymer (A), the cohesive force and glass transition temperatures of the constituent blocks of the acrylic block copolymer (A), and the required physical properties of the acrylic block copolymer (A), the carboxyl group (d) may be appropriately introduced under preferred conditions according to purposes. As a nonlimiting example, from the viewpoint of control of the reactive site of the acrylic block copolymer (A) and ease of introduction of the carboxyl group (d) into the acrylic block copolymer (A), the carboxyl group (d) is preferably introduced into the block containing the acid anhydride group (c). From the viewpoint of heat resistance and cohesive force, the carboxyl group (d) is more preferably introduced into the methacrylic polymer block (a). This is because when the carboxyl group (d) having high Tg and high cohesive force is introduced into the hard segment, the rubber elasticity can be further expressed even at a high temperature. When the carboxyl group (d) is introduced into the acrylic polymer block (b), the carboxyl group (d) can be used as a cross-linking reactive site (cross-linking point) for imparting oil resistance and higher rubber elasticity and compression set characteristic, and compatibility with cross-linked rubber, the thermoplastic resin and/or the thermoplastic elastomer can be desirably improved.

The number of the carboxyl group (d) per polymer block may be at least one. When the number is 2 or more, polymerization of a monomer containing the carboxyl group (d) may be random copolymerization or block copolymerization. For example, a (a-b-a)-triblock copolymer may be any type of (a/y)-b-a, (a/y)-b-(a/y), y-a-b-a, y-a-b-a-y, a-(b/y)-a, a-b-y-a, a-y-b-y-a, (a/y)-(b/y)-(a/y), and y-a-y-b-y-a-y. In these expressions, y represents a monomer or polymer block containing the carboxyl group (d), (a/y) represents copolymerization of the methacrylic polymer block (a) with a monomer containing the carboxyl group (d), and (b/y) represents copolymerization of the acrylic polymer block (b) with a monomer containing the carboxyl group (d).

In the methacrylic polymer block (a) or the acrylic polymer block (b), the segment and form in which y is contained may be freely determined according to purposes.

A preferred range of contents of the carboxyl group (d) depends on the cohesive force of the carboxyl group (d), the structure and composition of the acrylic block copolymer (A), the number of the constituent blocks of the acrylic block copolymer (A), and the introduction segment and form of the carboxyl group (d).

For example, the content of the carboxyl group (d) preferably ranges from 0 to 50% by weight, more preferably 0.1 to 50% by weight, and most preferably 0.5 to 40% by weight, of the constituent monomers of the acrylic block copolymer (A). When the acrylic block copolymer (A) is required to have higher heat resistance and cohesive force, the carboxyl group (d) is preferably introduced within a range to 50% by weight. With the content of over 50% by weight, the carboxyl group (d) tends to cyclize with an adjacent ester unit at a high temperature, and thus the operation for introducing the carboxyl group (d) tends to become complicated. When the carboxyl group (d) is produced in the process for introducing the acid anhydride group (c), 0.1% by weight or more of the carboxyl group (d) is generally produced. When less than 0.1% by weight of the carboxyl group (d) is introduced into the hard segment, heat resistance and cohesive force may be not sufficiently improved. The content of the carboxyl group (d) is represented by percent by weight of a monomer unit originally containing the carboxyl group (d) or a monomer unit having the carboxyl group (d) produced by reaction or the like. The content can be determined by $^{13}C(^1H)$-NMR analysis.

<Methacrylic Polymer Block (a)>

The constituent monomer of the methacrylic polymer block (a) preferably satisfies the relation $Tg_a > Tg_b$ between the glass transition temperatures of the methacrylic polymer block (a) and the acrylic polymer block (b) which constitute the acrylic block copolymer (A). Also, the monomer preferably comprises a methacrylate and another vinyl monomer copolymerizable with the methacrylate from the viewpoint of easy production of the acrylic block copolymer having desired physical properties, cost, and availability. Furthermore, a monomer containing the acid anhydride group (c) or the carboxyl group (d) may be contained as a methacrylate. The ratio of the methacrylate is preferably 50% by weight or more, and more preferably 75% by weight or more, of the whole of the methacrylic polymer block (a). With the ratio of less than 50% by weight, the characteristics of methacrylates, for example, weather resistance, high glass transition temperatures, and compatibility with resins, may deteriorate. The ratio of another vinyl monomer copolymerizable with the methacrylate is preferably 0 to 50% by weight, and more preferably 0 to 25% by weight.

The required molecular weight of the methacrylic polymer block (a) may be determined according to the required cohesive force of the methacrylic polymer block (a) and the time required for polymerization therefor.

The cohesive force is considered to depend on molecular interaction and a degree of entanglement. As the molecular weight increases, the number of entanglement points increases to increase the cohesive force. Namely, assuming that the required molecular weight of the methacrylic polymer block (a) is $M_a$, and the molecular weight of an entanglement strand of the constituent polymer of the methacrylic polymer block (a) is $Mc_a$, a preferred example of the $M_a$ range is $M_a > Mc_a$ when cohesive force is required, and $M_a > 2Mc_a$ when higher cohesive force is required. When a certain degree of cohesive force and a creeping property are simultaneously satisfied, the $M_a$ range is preferably $Mc_a < M_a < 2Mc_a$. As the molecular weight of the entanglement strand, the value described in the document by Wu, et al. (Polym. Eng. and Sci.), 1990, vol. 30, p. 753) may be referred.

For example, on the assumption that the methacrylic polymer block (a) entirely comprises methyl methacrylate, when the cohesive force is required, a preferred example of the number-average molecular weight of the methacrylic polymer block (a) is in a range of 9200 or more. However, when the acid anhydride group (c) is introduced into the methacrylic polymer block (a), the cohesive force is imparted by the acid anhydride group (c), and thus the molecular weight can be set to a lower value. Since the polymerization time tends to increase as the number-average molecular weight increases, the number-average molecular weight may be determined according to the required productivity. However, the number-average molecular weight is preferably 200,000 or less, and more preferably 100,000 or less.

Examples of the constituent methacrylate of the methacrylic polymer block (a) include methacrylic acid aliphatic hydrocarbon (for example, alkyl having 1 to 18 carbon atoms) esters, such as methyl methacrylate, ethyl methacrylate, n-propyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, and stearyl methacrylate; methacrylic acid alicyclic hydrocarbon esters such as cyclohexyl methacrylate and isobornyl methacrylate; methacrylic acid aralkyl esters such as benzyl methacrylate; methacrylic acid aromatic hydrocarbon esters such as phenyl methacrylate and tolyl methacrylate; methacrylic acid esters with functional group-containing alcohols having ether oxygen, such as 2-methoxyethyl methacrylate and 3-methoxybutyl methacrylate; methacrylic acid fluoroalkyl esters such as trifluoromethyl methacrylate, trifluoromethylmethyl methacrylate, 2-trifluoromethylethyl methacrylate, 2-trifluoroethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate, and 2-perfluorohexadecylethyl methacrylate. At lest one of these methacrylates is used. Among these methacrylates, methyl methacrylate is preferred from the viewpoint of compatibility with a thermoplastic resin to be combined, cost, and availability.

Examples of the vinyl monomer copolymerizable with the constituent methacrylate of the methacrylic polymer block (a) include acrylates, aromatic alkenyl compounds, vinyl cyanide compounds, conjugated diene compounds, halogen-containing unsaturated compounds, unsaturated carboxylic acid compounds, unsaturated dicarboxylic acid compounds, vinyl ester compounds, and maleimide compounds.

Examples of acrylates include acrylic acid aliphatic hydrocarbon (for example, alkyl having 1 to 18 carbon atoms) esters such as methyl acrylate, ethyl acrylate, n-propyl acrylate, n-butyl acrylate, isobutyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate, and stearyl acrylate; acrylic acid alicyclic hydrocarbon esters such as cyclohexyl acrylate and isobornyl acrylate; acrylic acid aromatic hydrocarbon esters such as phenyl acrylate and tolyl acrylate; acrylic acid aralkyl esters such as benzyl acrylate; acrylic acid esters with functional group-containing alcohols having ether oxygen, such as 2-methoxyethyl acrylate, and 3-methoxybutyl acrylate; acrylic acid fluoroalkyl esters such as trifluoromethylmethyl acrylate, 2-trifluoromethylethyl acrylate, 2-perfluoroethylethyl acrylate, 2-perfluoroethyl-2-perfluorobutylethyl acrylate, 2-perfluoroethyl acrylate, perfluoromethyl acrylate, diperfluoromethylmethyl acrylate, 2-perfluoromethyl-2-perfluoroethylmethyl acrylate, 2-perfluorohexylethyl acrylate, 2-perfluorodecylethyl acrylate, and 2-perfluorohexadecylethyl acrylate.

Examples of aromatic alkenyl compounds include styrene, α-methylstyrene, p-methylstyrene, and p-methoxystyrene.

Examples of vinyl cyanide compounds include acrylonitrile and methacrylonitrile.

Examples of conjugated diene compounds include butadiene and isoprene.

Examples of halogen-containing unsaturated compounds include vinyl chloride, vinylidene chloride, perfluoroethylene, perfluoropropylene, and vinylidene fluoride.

Examples of unsaturated carboxylic acid compounds include methacrylic acid and acrylic acid.

Examples of unsaturated dicarboxylic acid compounds include maleic anhydride, maleic acid, maleic acid monoalkyl esters and dialkyl esters, fumaric acid, and fumaric acid monoalkyl esters and dialkyl esters.

Examples of vinyl ester compounds include vinyl acetate, vinyl propionate, vinyl pivalate, vinyl benzoate, and vinyl cinnamate.

Examples of maleimide compounds include maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

At least one of these compounds is used. The vinyl monomer is preferably selected according to compatibility of the acrylic block copolymer with the cross-linked rubber (B), the thermoplastic resin (C), and/or the thermoplastic elastomer (D). A polymer of methyl methacrylate is depolymerized approximately quantitatively by thermal decomposition. Moreover, in order to suppress depolymerization, the polymer can be copolymerized with an acrylate, for example, methyl acrylate, ethyl acrylate, butyl acrylate, 2-methoxyethyl acrylate, or a mixture thereof, or styrene. In order to further improve oil resistance, the polymer can be copolymerized with acrylonitrile.

The glass transition temperature of the methacrylic polymer block (a) is preferably 100° C. or more, and more preferably 110° C. or more. With the glass transition temperature of less than 100° C., rubber elasticity at high temperatures degrades.

The glass transition temperature (Tg) of the methacrylic polymer block (a) can be determined from the weight ratio of the monomer of each polymer segment according to the Fox's equation. The glass transition temperature is calculated according to the Fox's equation using the polymerization ratio of each monomer and the glass transition temperature of a homopolymer of each monomer which is described in Polymer Handbook Third Edition (Wiley-Interscience 1989).

<Acrylic Polymer Block (b)>

The constituent monomer of the acrylic polymer block (b) preferably satisfies the relation $Tg_a > Tg_b$ between the glass transition temperatures of the methacrylic polymer block (a) and the acrylic polymer block (b) which constitute the acrylic block copolymer (A). Also, the monomer preferably comprises an acrylate and a vinyl monomer copolymerizable with the acrylate from the viewpoint of easy production of a composition having desired physical properties, cost, and availability. Furthermore, a monomer containing the acid anhydride group (c) or the carboxyl group (d) may be contained as an acrylate. The ratio of the acrylate is preferably 50% by weight or more, and more preferably 70% by weight or more, of the whole of the acrylic polymer block (b). With the ratio of less than 50% by weight, the physical properties of a composition, particularly impact resistance, flexibility, and oil resistance, which are characteristic of use of an acrylate, may deteriorate. The ratio of another vinyl monomer copolymerizable with the acrylate is preferably 0 to 50% by weight, and more preferably 0 to 30% by weight.

The required molecular weight of the acrylic polymer block (b) may be determined according to the elastic modulus and rubber elasticity of the acrylic polymer block (b), and the time required for polymerization therefor.

The elastic modulus is closely related to the mobility of a molecular chain and the molecular weight thereof, and the inherent elastic modulus is not exhibited unless the molecular weight is a certain value or more. This is true for rubber elasticity, but the molecular weight is preferably as large as possible from the viewpoint of rubber elasticity. For example, a range of the required molecular weight $M_b$ of the acrylic polymer block (b) is preferably $M_b>3,000$, more preferably $M_b>5,000$, further preferably $M_b>10,000$, particularly preferably $M_b>20,000$, and most preferably $M_b>40,000$. However, the polymerization time tends to increase as the number-average molecular weight increases, and thus the molecular weight is preferably 500,000 or less, and more preferably 300,000 or less according to the required productivity.

Examples of the acrylate constituting the acrylic polymer block (b) include the same as acrylates used for the methacrylic polymer block (a). At least one of the acrylates is used.

Among the acrylates, n-butyl acrylate is preferred from the viewpoint of impact resistance, compression set, cost, and availability. When oil resistance is required, ethyl acrylate is preferred. When a material having flexibility, low-temperature characteristics, and lower hardness is required, 2-ethylhexyl acrylate is preferred. When a material having a balance between flexibility and mechanical strength, and lower hardness is required, a mixture of n-butyl acrylate and 2-ethylhexyl acrylate is preferred. When oil resistance and low-temperature characteristics are desired to be simultaneously satisfied, a mixture of ethyl acrylate, n-butyl acrylate, and 2-methoxyethyl acrylate is preferred. When oil resistance and flexibility are required, a mixture of n-butyl acrylate and 2-methoxyethyl acrylate is preferred.

Examples of the vinyl monomer copolymerizable with the constituent acrylate of the acrylic polymer block (b) include methacrylates, aromatic alkenyl compounds, vinyl cyanide compounds, conjugated diene compounds, halogen-containing unsaturated compounds, unsaturated dicarboxylic acid compounds, vinyl ester compounds, and maleimide compounds. Specific examples of these compounds include the same as those used for the methacrylic polymer block (a).

At least one of these compounds is used. The vinyl monomer is preferably selected according to the required glass transition temperature, elastic modulus, and polarity of the acrylic polymer block (b), the required physical properties of a composition, and compatibility with the cross-linked rubber, the thermoplastic resin, and/or the thermoplastic elastomer. For example, in order to improve oil resistance of a composition, the polymer block (b) can be copolymerized with acrylonitrile.

The glass transition temperature of the acrylic polymer block (b) is preferably 50° C. or less, and more preferably 0° C. or less. With the glass transition temperature of over 50° C., the rubber elasticity of the acrylic block copolymer (A) may degrade.

The glass transition temperature (Tg) of the acrylic polymer block (b) can be determined from the weight ratio of the monomer of each polymer segment according to the Fox's equation. The glass transition temperature is calculated according to the Fox's equation using the polymerization ratio of each monomer and the glass transition temperature of a homopolymer of each monomer, which is described in Polymer Handbook Third Edition (Wiley-Interscience 1989).

<Acid Anhydride Group (c)>

The acid anhydride group (c) is characterized in that it has reactivity against a compound having an amino group, a hydroxyl group, an epoxy group, or the like, and thus it can be used as a reactive site for modifying a polymer, as a site for improving compatibility in a blend with the cross-linked rubber, the thermoplastic resin, and/or the thermoplastic elastomer, or as a cross-linking point for imparting higher rubber elasticity to a soft segment. Since the acid anhydride group (c) also has a high glass transition temperature (Tg), the acid anhydride group (c) has the effect of improving the heat resistance of the acrylic block copolymer (A) when being introduced into the hard segment. The glass transition temperature of a polymer containing an acid anhydride group is high, and for example, the glass transition temperature of polymethacrylic anhydride is as high as 159° C. By introducing a unit containing the acid anhydride, the heat resistance of the acrylic block copolymer can be improved.

As a method for introducing the acid anhydride group (c), preferably, a precursor of the acid anhydride group (c) is introduced into the acrylic block copolymer and then cyclized. As a nonlimiting example, the acid anhydride group is preferably introduced by melt-kneading cyclization, at a temperature of 180° C. to 300° C., of an acrylic block copolymer (A') comprising a methacrylic polymer block (a) and a acrylic polymer block (b), at least one of these polymer blocks (a) and (b) containing at least one unit represented by formula (2)

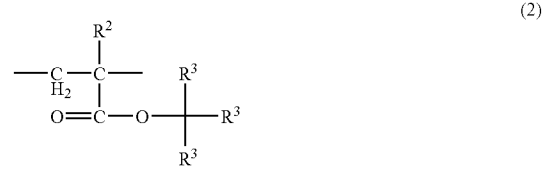

(2)

(wherein $R^2$ represents a hydrogen atom or a methyl group, and $R^3$s each represent a hydrogen atom, a methyl group, or a phenyl group and may be the same or different as long as at least one of $R^3$s is a methyl group).

The unit represented by formula (2) can be introduced into the acrylic block copolymer by copolymerization with an acrylate or methacrylate monomer derived from the unit represented by formula (2).

The unit represented by formula (2) undergoes elimination and cyclization with the adjacent ester unit at a high temperature to produce an acid anhydride group (refer to, for example, Hatada, et al., J. M. S.-PURE APPL. CHEM., A30 (9&10), PP. 645-667 (1993)). According to this document, a polymer having a bulk ester unit and β-hydrogen generally undergoes decomposition of the ester unit and then cyclization at a high temperature to produce an acid anhydride group. By using this method, the acid anhydride group can easily be introduced into the acrylic block copolymer.

Specific examples of such a monomer include, without limitation to, tert-butyl acrylate, isopropyl acrylate, α,α-dimethylbenzyl acrylate, α-methylbenzyl acrylate, tert-butyl methacrylate, isopropyl methacrylate, α,α-dimethylbenzyl methacrylate, and α-methylbenzyl methacrylate. Among these monomers, tert-butyl acrylate and tert-butyl methacrylate are preferred from the viewpoint of availability, easy polymerization, and easy production of the acid anhydride group.

In order to form the acid anhydride group, the acrylic block copolymer (A') is preferably heated at a high temperature. As a nonlimiting example, heating is preferably performed at 180° C. to 300° C. With heating at a temperature of lower than 180° C., the acid anhydride group may be not sufficiently produced, while with heating at a temperature of over 300° C., the polymer (A') may be decomposed.

<Carboxyl Group (d) and Carboxyl Group (e)>

A carboxyl group has high cohesive force, and a monomer containing a carboxyl group has a high glass transition temperature (Tg) and thus has the effect of improving the heat resistance of the acrylic block copolymer. Although a functional group such as a hydroxyl group also has a hydrogen bonding ability, the functional group has low Tg and has the small effect of improving heat resistance, as compared with a monomer containing a carboxyl group. Therefore, from the viewpoint of further improvements in heat resistance and cohesive force of the acrylic block copolymer (A), the acrylic block copolymer may contain the carboxyl group (d) and/or the carboxyl group (e).

A method for introducing the carboxyl group (d) is not particularly limited, but the carboxyl group (d) is preferably produced in the process for introducing the acid anhydride group into the acrylic block copolymer (A).

The method will be described below.

In the acrylic block copolymer (A') having the unit represented by formula (2), the unit represented by formula (2) undergoes elimination and cyclization with the adjacent ester unit at a high temperature to produce the acid anhydride group (c). In this case, the ester units partially take a path comprising decomposition of the ester unit to produce the carboxyl group (d), and then cyclization to produce the acid anhydride group (c). By utilizing this path, the carboxyl group (d) can be introduced by appropriately controlling the heating temperature and time according to the type and content of the unit represented by formula (2). Specifically, the acrylic block copolymer (A') may be heated under pressure in the state of a polymer solution or directly heated to melt. In view of simplicity of production, the acrylic block copolymer (A') is more preferably melt-kneaded. In melt-kneading the acrylic block copolymer (A'), the melt-kneading time (the retention time in an extruder when the extruder is used) may be appropriately determined according to the melt-kneading temperature, the configuration of a screw, L/D (ratio of the effective length L of the screw to the diameter D of the screw), and the rotational speed of the screw. In this method, the carboxyl group (d) tends to cyclize with the adjacent ester unit at a high temperature. Therefore, when over 50% by weight of the carboxyl group (d) is introduced, an introduction operation tends to become complicated. Also, the physical properties after processing tend to change, thereby causing difficulty in producing products with stable physical properties.

When the acrylic block copolymer (A) is required to have higher heat resistance, the carboxyl group (e) can be introduced. From the viewpoint of cost and simplicity of production, the carboxyl group (e) is preferably introduced by a method in which the acid anhydride group of the acrylic block copolymer (A) is subjected to hydrolytic ring opening. As described above, the method for producing the carboxyl group (d) in the process for introducing the acid anhydride group (c) into the acrylic block copolymer (A) has the tendency that the carboxyl group (d) cyclizes with the adjacent ester unit, and thus the operation for introducing over 50% by weight of the carboxyl group (d) tends to become complicated. On the other hand, when the carboxyl group is introduced by direct polymerization with a monomer having the carboxyl group under polymerization conditions, the monomer having the carboxyl group may inactivate the catalyst used in the polymerization. Japanese Unexamined Patent Application Publication Nos. 2001-234147 and 10-298248 disclose a method for introducing a carboxyl group in which a carboxyl group is introduced in a form protected by an appropriate protective group or in the form of a functional group as a precursor of the carboxyl group into an acrylic block copolymer, followed by selective decomposition. This method has the problem of cost, and the tendency that production becomes complicated.

Although the carboxyl group (e) is produced by hydrolysis of the acid anhydride group (c), the carboxyl group (e) need not be discriminated from the carboxyl group (d) produced in the process for introducing the acid anhydride group (c). These carboxyl groups can easily be introduced so that the total of the monomer containing the carboxyl group (d) and the monomer containing the carboxyl group (e) is 50% by weight or more of the monomers constituting the acrylic block copolymer (A). Also, the acid anhydride groups (c) are entirely hydrolyzed to produce a block copolymer having only carboxyl groups as functional groups.

Such an acrylic block copolymer can be preferably produced by hydrolytic ring opening of the acid anhydride group (c) of the acrylic block copolymer (A). The method for introducing the carboxyl group (e) by hydrolysis is not particularly limited, but the acrylic block copolymer (A) may be heated together with water under pressure or melt-kneaded with water. From the viewpoint of simplicity of production and cost, the acrylic block copolymer (A) is preferably melt-kneaded with water.

The method of heating the acrylic block copolymer (A) together with water under pressure can be performed in a pressure-resistant reactor. The method of melt-kneading the acrylic block copolymer (A) with water can be performed in any one of various apparatuses capable of simultaneously performing heating and kneading. Examples of such apparatuses include apparatuses generally used for processing rubber, such as a Banbury mixer, a kneader, and a single-screw or multi-screw extruder. In view of reactivity into the carboxyl group and simplicity of production, an extruder is preferably used, and a closed extruder is more preferably used. In melt-kneading the acrylic block copolymer (A), the melt-kneading time (retention time in the extruder used) may be appropriately determined according to the melt-kneading temperature, the configuration of the screw, L/D (ratio of the effective length L of the screw to the diameter D of the screw), the screw rotational speed, and the like.

A polymer having the carboxyl group (d) and/or the carboxyl group (e) has a high glass transition temperature, and for example, polymethacrylic acid has a glass transition temperature of as high as 228° C. Therefore, the heat resistance of the acrylic block copolymer (A) can be improved by introducing a monomer constituting carboxyl group.

The content of the carboxyl groups may be appropriately determined according to the required physical properties of the acrylic block copolymer (A).

<Process for Producing the Acrylic Block Copolymer (A')>

Although the process for producing the acrylic block copolymer (A') is not particularly limited, controlled polymerization using an initiator for a polymer is preferably performed. Examples of the controlled polymerization include living anionic polymerization, radical polymerization using a chain transfer agent, and living radical polymerization recently developed. In particular, living radical polymerization is preferred from the viewpoint of control of the molecular weight and structure of the acrylic block copolymer.

The living radical polymerization is radical polymerization in which the activity of the polymerization terminal is maintained without a loss. In a narrow sense, living polymerization represents polymerization in which the terminal continuously possesses activity. However, living polymerization includes pseudo living polymerization in which inactivated terminals are equilibrium with activated terminals. In the present invention, the meaning of living polymerization includes the pseudo living polymerization. In recent years, living radical polymerization has been actively studied by various groups.

Examples of living radical polymerization include polymerization using a polysulfide as a chain transfer agent, polymerization using a cobalt porphyrin complex (Journal of American Chemical Society (J. Am. Chem. Soc.), 1994, vol. 116, p. 7943) or a nitroxide compound as a radical scavenger (Macromolecules, 1994, vol. 27, p. 7228), and atom transfer radical polymerization (ATRP) using an organic halide as an initiator and a transition metal complex as a catalyst. In the present invention, any one of these polymerization methods can be used, but atom transfer radical polymerization is preferred from the viewpoint of ease of control.

The atom transfer radical polymerization is performed using an organic halide or a sulfonyl halide compound as an initiator, and using a metal complex including a central metal selected from the elements of Groups VII, VIII, IX, X, or XI of the periodic table as a catalyst (refer to, for example, Matyjaszewski, et al., J. Am. Chem. Soc., 1995, Vol. 117, p. 5614, Macromolecules, 1995, Vol. 28, p. 7901, Science, 1996, Vo. 272, p. 866, or Sawamoto, et al., (Macromolecules, 1995, Vol. 28, p. 1721).

This is a radical polymerization method which generally has a very high polymerization rate and which easily causes termination reaction such as coupling between radicals or the like. However, polymerization proceeds in a living state to produce a polymer having a narrow molecular weight distribution (Mw/Mn=1.1 to 1.5), and the molecular weight can be freely controlled by the charging ratio of the monomer to the initiator.

In the atom transfer radical polymerization, a mono-, di- or higher-functional compound can be used as the organic halide or the sulfonyl halide compound serving as the initiator. These compounds may be appropriately used according to purposes. However, a monofunctional compound is preferably used for producing a diblock copolymer from the viewpoint of availability of the initiator, and a difunctional compound is preferably used for producing (a-b-a)-triblock copolymer or a (b-a-b)-triblock copolymer from the viewpoint of the number of the reaction steps and the short reaction time. A polyfunctional compound is preferably used for producing a branched block copolymer from the viewpoint of the number of the reaction steps and the short reaction time.

A polymeric initiator can be used as the initiator. The polymeric initiator is a compound among the organic halide and the sulfonyl halide compound, and comprises a polymer having a halogen atom bonded to an end of its molecular chain. Such a polymeric initiator can be produced by a controlled polymerization method other than the living radical polymerization method, and is thus characteristic in that a block copolymer comprising polymers bonded together and produced by different polymerization methods can be produced.

Examples of the monofunctional compound include the following:

$C_6H_5$—$CH_2X$
$C_6H_5$—$C(H)(X)$—$CH_3$
$C_6H_5$—$C(X)(CH_3)_2$
$R^4$—$C(H)(X)$—$COOR^5$
$R^4$—$C(CH_3)(X)$—$COOR^5$
$R^4$—$C(H)(X)$—$CO$—$R^5$
$R^4$—$C(CH_3)(X)$—$CO$—$R^5$
$R^4$—$C_6H_4$—$SO_2X$

In the formulae, $C_6H_5$ represents a phenyl group, $C_6H_4$ represents a phenylene group (which may be any one of ortho-substituted, metha-substituted, and para-substituted), $R^4$ represents a hydrogen atom, an alkyl group having 1 to 20 carbon atoms, an aryl group having 6 to 20 carbon atoms, or an aralkyl group having 7 to 20 carbon atoms, X represents chlorine, bromine, or iodine, and $R^5$ represents a monovalent organic group having 1 to 20 carbon atoms.

Examples of an alkyl group (including an alicyclic hydrocarbon group) having 1 to 20 carbon atoms as $R^4$ include methyl, ethyl, propyl, isopropyl, n-butyl, isobutyl, tert-butyl, n-pentyl, n-hexyl, cyclohexyl, n-heptyl, n-octyl, 2-ethylhexyl, nonyl, decyl, dodecyl, and isobornyl. Examples of an aryl group having 6 to 20 carbon atoms include phenyl, tolyl, and naphthyl. Examples of an aralkyl group having 7 to 20 carbon atoms include benzyl and phenetyl.

Examples of a monovalent organic group having 1 to 20 carbon atoms as $R^5$ include the same as those of $R^4$.

Specific examples of the monofunctional compound include tosyl bromide, methyl 2-bromopropionate, ethyl 2-bromopropionate, butyl 2-bromopropionate, methyl 2-bromoisobutyrate, ethyl 2-bromoisobutyrate, and butyl 2-bromoisobutyrate. Among these compounds, ethyl 2-bromopropionate and butyl 2-bromopropionate are preferred from the viewpoint that polymerization can easily be controlled because the structures are similar to that of an acrylate monomer.

Examples of the difunctional compound include the following:

$X$—$CH_2$—$C_6H_4$—$CH_2$—$X$
$X$—$CH(CH_3)$—$C_6H_4$—$CH(CH_3)$—$X$
$X$—$C(CH_3)_2$—$C_6H_4$—$C(CH_3)_2$—$X$
$X$—$CH(COOR_6)$—$(CH_2)_n$—$CH(COOR^6)$—$X$
$X$—$C(CH_3)(COOR^6)$—$(CH_2)_n$—$C(CH_3)(COOR^6)$—$X$
$X$—$CH(COR^6)$—$(CH_2)_n$—$CH(COR^6)$—$X$
$X$—$C(CH_3)(COR^6)$—$(CH_2)_n$—$C(CH_3)(COR^6)$—$X$
$X$—$CH_2$—$CO$—$CH_2$—$X$
$X$—$CH(CH_3)$—$CO$—$CH(CH_3)$—$X$
$X$—$C(CH_3)_2$—$CO$—$C(CH_3)_2$—$X$
$X$—$CH(C_6H_5)$—$CO$—$CH(C_6H_5)$—$X$
$X$—$CH_2$—$COO$—$(CH_2)_n$—$OCO$—$CH_2$—$X$
$X$—$CH(CH_3)$—$COO$—$(CH_2)_n$—$OCO$—$CH(CH_3)$—$X$
$X$—$C(CH_3)_2$—$COO$—$(CH_2)_n$—$OCO$—$C(CH_3)_2$—$X$
$X$—$CH_2$—$CO$—$CO$—$CH_2$—$X$
$X$—$CH(CH_3)$—$CO$—$CO$—$CH(CH_3)$—$X$
$X$—$C(CH_3)_2$—$CO$—$CO$—$C(CH_3)_2$—$X$
$X$—$CH_2$—$COO$—$C_6H_4$—$OCO$—$CH_2$—$X$
$X$—$CH(CH_3)$—$COO$—$C_6H_4$—$OCO$—$CH(CH_3)$—$X$
$X$—$C(CH_3)_2$—$COO$—$C_6H_4$—$OCO$—$C(CH_3)_2$—$X$
$X$—$SO_2$—$C_6H_4$—$SO_2$—$X$

In the formulae, $R^6$ represents alkyl having 1 to 20 carbon atoms, aryl having 6 to 20 carbon atoms, or aralkyl having 7 to 20 carbon atoms, and n represents an integer of 0 to 20. $C_6H_5$, $C_6H_4$, and X represent the same as the above.

Specific examples of alkyl having 1 to 20 carbon atoms, aryl having 6 to 20 carbon atoms, and aralkyl having 7 to 20 carbon atoms as $R^6$ are the same as those of alkyl having 1 to 20 carbon atoms, aryl having 6 to 20 carbon atoms, and aralkyl having 7 to 20 carbon atoms as $R^4$.

Specific examples of the difunctional compound include bis(bromomethyl)benzene, bis(1-bromoethyl)benzene, bis(1-bromoisopropyl)benzene, dimethyl 2,3-dibromosuccinate, diethyl 2,3-dibromosuccinate, dibutyl 2,3-dibromosuccinate, dimethyl 2,4-dibromoglutarate, diethyl 2,4-dibromoglutarate, dibutyl 2,4-dibromoglutarate, dimethyl 2,5-dibromoadipate, diethyl 2,5-dibromoadipate, dibutyl 2,5-dibromoadipate, dimethyl 2,6-dibromopimelate, diethyl 2,6-dibromopimelate, dibutyl 2,6-dibromopimelate, dimethyl 2,7-dibromosuberate, diethyl 2,7-dibromosuberate, and dibutyl 2,7-dibromosuberate. Among these compounds, bis(bromomethyl)benzene, diethyl 2,5-dibromoadipate, and diethyl 2,6-dibromopimelate are preferred from the viewpoint of availability.

Examples of the polyfunctional compound include the following:

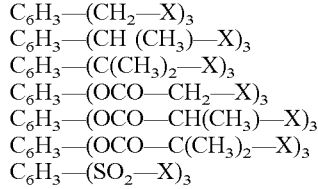

In the formulae, $C_6H_3$ represents a trivalent phenyl group (having any desired combination of three bonding positions among the 1- to 6-position), and X represents the same as the above.

Specific examples of the polyfunctional group include tris(bromomethyl)benzene, tris(1-bromoethyl)benzene, and tris(1-bromoisopropyl)benzene. Among these compounds, tris(bromomethyl)benzene is preferred from the viewpoint of availability.

When an organic halide or sulfonyl halide compound having a functional group other than a polymerization initiating group is used, a polymer having a functional group other than a polymerization initiating group in its terminal or its molecule can be obtained. Examples of a functional group other then a polymerization initiating group include alkenyl, hydroxyl, epoxy, amino, amido, and silyl.

The organic halide or sulfonyl halide compound which can be used as the initiator has a carbon atom bonded to a halogen group (halogen atom) and to a carbonyl or phenyl group, and a carbon-halogen bond is activated to initiate polymerization. The amount of the initiator used may be determined from a molar ratio to the monomer used according to the required molecular weight of the acrylic block copolymer. Namely, the molecular weight of the acrylic block copolymer can be controlled by controlling the number of the monomer molecules used per molecule of the initiator.

Although the transition metal complex used as the catalyst for the atom transfer radical polymerization is not particularly limited, complexes of mono- or zero-valent copper, divalent ruthenium, divalent iron, and divalent nickel are preferably used.

Among these complexes, copper complexes are preferred from the viewpoint of cost and reaction controllability. Examples of copper (I) compounds include cuprous chloride, cuprous bromide, cuprous iodide, cuprous cyanide, cuprous oxide, and cuprous perchlorate. Among these compounds, cuprous chloride and cuprous bromide are preferred from the viewpoint of polymerization controllability. When a copper (I) compound is used, a ligand may be added for increasing catalytic activity. Examples or such a ligand include 2,2'-bipyridyl compounds such as 2,2'-bipyridyl and its derivatives (for example, 4,4'-dinoryl-2,2'-bipyridyl and 4,4'-di(5-noryl) -2,2'-bipyridyl); 1,10-phenanthroline compounds such as 1,10-phenanthroine and its derivatives (for example, 4,7-dinoryl-1,10-phenanthroline and 5,6-dinoryl-1,10-phenanthroline); and polyamines such as tetramethylethylenediamine (TMEDA), pentamethyldiethylenetriamine, and hexamethyl (2-aminoethyl) amine.

Also, a tristriphenylphosphine complex $(RuCl_2(PPh_3)_3)$ of ruthenium (II) chloride is preferred as the catalyst. When a ruthenium compound is used as the catalyst, an aluminum alkoxide may be added as an activating agent. Furthermore, a bistriphenylphosphine complex $(FeCl_2(PPh_3)_2)$ of divalent iron, a bistriphenylphosphine complex $(NiCl_2(PPh_3)_2)$ of divalent nickel, and a bistributylphosphine complex $(NiBr_2(PBu_3)_2)$ of divalent nickel are preferred as the catalyst.

Although the types of the catalyst, ligand, and activating agent used are not particularly limited, the types may be properly determined from the relation between the required reaction rate and the types of the initiator, monomer, and solvent used. For example, when an acrylic monomer such as an acrylate or the like is used for polymerization, a propagation end of a polymer chain preferably has a carbon-bromine bond from the controllability of polymerization. Therefore, preferably, an organic bromide or sulfonyl bromide is used as the initiator, and acetonitrile is used as the solvent, a metal complex including copper of copper bromide, preferably cuprous bromide, as a central metal is used as the catalyst, and pentamethyldiethylenetriamine or the like is used as the ligand. On the other hand, when a methacrylic monomer such as a methacrylate or the like is used for polymerization, a propagation end of a polymer chain preferably has a carbon-chlorine bond from the viewpoint of the controllability of polymerization. Therefore, preferably, an organic chloride or sulfonyl chloride is used as the initiator, and acetonitrile, and if required, a mixture with toluene, is used as the solvent, a metal complex including copper of copper chloride, preferably cuprous chloride, as a central metal is used as the catalyst, and pentamethyldiethylenetriamine or the like is used as the ligand.

The amounts of the catalyst and ligand used may be properly determined from the relation between the required reaction rate and the amounts of the initiator, monomer, and solvent used. For example, when a polymer having a high molecular weight is desired, the initiator/monomer ratio must be lower than that for producing a polymer having a low molecular weight. In this case, the reaction rate can be increased by increasing the amounts of the catalyst and ligand used. Also, when a polymer having a higher glass transition temperature than room temperature is produced, in some cases, an appropriate organic solvent is added for decreasing the viscosity of the system and increasing the efficiency of stirring, and thus the reaction rate tends to decrease. In this case, the reaction rate can be increased by increasing the amounts of the catalyst and ligand used.

The atom transfer radical polymerization can be performed without a solvent (bulk polymerization) or in any of various solvents. The bulk polymerization or polymerization in any of various solvents can be stopped during the reaction.

Examples of the solvent include hydrocarbon solvents, ether solvents, halogenated hydrocarbon solvents, ketone solvents, alcohol solvents, nitrile solvents, ester solvents, and carbonate solvents.

Examples of hydrocarbon solvents include benzene and toluene. Examples of ether solvents include diethyl ether and tetrahydrofuran. Examples of halogenated hydrocarbon solvents include methylene chloride and chloroform. Examples of ketone solvents include acetone, methyl ethyl ketone, and methyl isobutyl ketone. Examples of alcohol solvents include methanol, ethanol, propanol, isopropanol, n-butanol, and tert-butanol. Examples of nitrile solvents include acetonitrile, propionitrile, and benzonitrile. Examples of ester solvents include ethyl acetate and butyl acetate. Examples of carbonate solvents include ethylene carbonate and propylene carbonate.

At least one of these solvents can be used.

When the solvent is used, the amount of the solvent used may be properly determined based on the relation between the viscosity of the whole system and the required efficiency of stirring. When bulk polymerization or polymerization in a solvent is stopped during the reaction, the conversion rate of the monomer at the reaction stop point may be properly determined based on the relation between the viscosity of the whole system and the required efficiency of stirring.

The polymerization can be performed in the range of 23° C. to 200° C., and preferably 50° C. to 150° C.

Examples of a method for producing the acrylic block copolymer by the polymerization include a method of successively adding monomers, a method of polymerizing a monomer for a second block using a previously synthesized polymer as a polymeric initiator, and a method of bonding different polymers by reaction, the polymers being separately produced by polymerization. Any one of these methods may be properly used according to purposes. In view of simplicity of the production process, the method of successively adding monomers is preferably used. When it is desired to avoid a remaining monomer of a first block from being copolymerized with a second block, the method of polymerizing a monomer of the second block using the previously synthesized polymer as the polymeric initiator is preferably used.

Description will be made of the method of successively adding monomers, and the method of polymerizing a monomer of the second block using the previously synthesized polymer as the polymeric initiator. However, the method for producing the acrylic block copolymer of the present invention is not limited to these methods.

In the method of successively adding monomers, the second monomer to be polymerized is preferably charged when the conversion ratio of the first monomer to be polymerized reaches 80% to 95%. When polymerization proceeds until the conversion ratio exceeds 95%, the propagation reaction of a polymer chain is inhibited with high probability. There is also the tendency that polymer radicals readily react with each other to easily cause side reactions such as disproportionation, coupling, chain transfer, and the like. When the second monomer to be polymerized is charged at a conversion ratio of less than 80%, the first monomer to be polymerized may be disadvantageously mixed and copolymerized with the second monomer to be polymerized.

In this case, possible methods for adding in order the monomers include a method (p1) in which an acrylic monomer is first charged and polymerized, and then a methacrylic monomer is charged and polymerized, and a method (q1) in which a methacrylic monomer is first charged and polymerized, and then an acrylic monomer is charged and polymerized. The method (p1) in which an acrylic monomer is first charged and polymerized, and then a methacrylic monomer is charged and polymerized is preferred from the viewpoint of controllability of polymerization. This is because it is preferable that the methacrylic polymer block is propagated from the end of the acrylic polymer block.

As a possible example of the method of polymerizing a monomer of the second block using the previously synthesized polymer as the polymeric initiator, polymerization of a monomer of the first block is stopped at a desired point by decreasing the temperature in a living state, and a monomer of the second block is added after the monomer of the first block is removed by distillation or the like under reduced pressure. When polymerization of monomer of a third block is desired, the same operation as that for the second block may be performed. This method can avoid the remaining monomer of the previous block from being copolymerized in polymerization of a monomer of the subsequent block.

In this case, possible methods for polymerizing in order the monomers of the blocks include a method (p2) in which an acrylic block is first produced by polymerization, and then a methacrylic block is produced by polymerization, and a method (q2) in which a methacrylic block is first produced by polymerization, and then an acrylic block is produced by polymerization. The method (p2) in which an acrylic block is first produced by polymerization, and then a methacrylic block is produced by polymerization is preferred from the viewpoint of controllability of polymerization. This is because it is preferable that the methacrylic polymer block be propagated from the end of the acrylic polymer block.

Next, a method for determining the conversion ratio of the acrylic monomer, the methacrylic monomer, or the like will be described. In order to determine the conversion ratio, a gas chromatographic (GC) method, a weight method, or the like can be used. In the GC method, reaction solutions are sampled from the polymerization system at any time before initiation of the reaction and in the course of the reaction and subjected to GC measurement, and the consumption rate of a monomer is determined from the existence ratio of the monomer to the internal standard previously added to the polymerization system. This method is advantageous in that even when a plurality of monomers is present in the system, the conversion ratios can be independently determined. In the weight method, a reaction solution is sampled from the polymerization system, and a solid concentration is determined from the weights before and after drying to determine the overall conversion ratio of monomers. This method is advantageous in that the conversion ratio can easily be determined. Of these methods, the GC method is preferred for a case in which a plurality of monomers is present in the system, for example, the acrylic monomer is present as a co-monomer for the methacrylic monomer.

The reaction solution obtained by polymerization contains a mixture of a polymer and a metal complex. Therefore, an organic acid containing a carboxyl group or a sulfonyl group is added to the reaction solution to produce a salt with the metal complex so that the salt with the metal complex can be removed as a solid by filtration or the like. Then, the impurities such as the acid remaining in the solution are removed by adsorption with basic activated alumina, a basic adsorbent, a solid inorganic acid, an anion exchange resin, or a cellulose anion exchanger to produce a solution of the acrylic block copolymer.

Then, the polymerization solvent and unreacted monomers remaining in the thus-obtained polymer solution are removed by evaporation to isolate the acrylic block copolymer. As the evaporation method, a thin-film evaporation method, a flash evaporation method, a horizontal evaporation method using an extrusion screw, or the like can be used. Since the acrylic block copolymer has tackiness, evaporation can be efficiently performed by the horizontal evaporation method using the extrusion screw among these evaporation methods, or by combination of the horizontal evaporation method with another evaporation method.

<Process for Producing Acrylic Block Copolymer (A)>

A preferred process for producing the acrylic block copolymer (A) comprises heating the acrylic block copolymer (A') at a high temperature of 180° C. to 300° C. In this process, the acrylic block copolymer (A') may be heated in the state of the polymer solution under pressure, heated while being subjected to evaporation for removing the solvent from the polymer solution, or directly heat-melted. However, from the viewpoint of reactivity into the acid anhydride group and simplicity of production, the acrylic block copolymer (A') is preferably directly heat-melted. The acrylic block copolymer (A') is more preferably melt-kneaded.

The method of heating the acrylic block copolymer (A') in the state of the polymer solution can be performed using a pressure-resistant reactor. The method of heating the acrylic block copolymer (A') while removing the solvent from the polymer solution by evaporation can be performed by the horizontal evaporation method using the extrusion screw. The method of directly heat-melting the acrylic block copolymer (A') can be performed using a pressing machine or an injection molding machine.

In order to further improve the efficiency of the reaction, the acrylic block copolymer (A') may be melt-kneaded by any of various apparatuses capable of heating and kneading at the same time. Examples of such apparatuses include apparatuses ordinarily used for rubber, such as a Banbury mixer, a kneader, and a single-screw or multi-screw extruder. As a nonlimiting example, an extruder is preferably used in view of reactivity into the acid anhydride group, and simplicity of production. When the acrylic block copolymer (A') is melt-kneaded, the melt-kneading time (retention time in an extruder if the extruder is used) may be appropriately determined according to the melt-kneading temperature, the configuration of the screw, L/D (effective length L of the screw/diameter D of the screw), the screw rotational speed, etc.

<Composition>

The acrylic block copolymer (A) of the present invention can be used as a composition with at least one selected from the group consisting of the cross-linked rubber (B), the thermoplastic resin (C), the thermoplastic elastomer (D), a lubricant (E), an inorganic filler (F), and a stabilizer (G). The composition can be suitably used for seal products or the like.

As a nonlimiting example, the composition of the acrylic block copolymer (A) with at least one of the cross-linked rubber (B), the thermoplastic resin (C), the thermoplastic elastomer (D), the lubricant (E), the inorganic filler (F), or the stabilizer (G) can be preferably used for the following cases:

The cross-linked rubber (B) is added to the acrylic block copolymer (A) to impart rubber elasticity to the acrylic block copolymer (A) and improve the physical properties thereof, such as low-temperature properties, or the acrylic block copolymer (A) is added to the cross-linked rubber (B) to impart thermoplasticity to the cross-linked rubber and improve the processability and recycle property of the cross-linked rubber (B). The thermoplastic resin (C) and/or the thermoplastic elastomer (D) is added to the acrylic block copolymer (A) to control the hardness of the acrylic block copolymer (A) and improve the physical properties thereof, such as mechanical properties and low-temperature properties, or the acrylic block copolymer (A) is added as a softener to the thermoplastic resin (C) and/or the thermoplastic elastomer (D) to control the hardness of the thermoplastic resin (C) and/or the thermoplastic elastomer CD) while maintaining the high elastic modulus and improving the compression set. The acrylic block copolymer (A) is added as a compatibilizer to at least two types of the cross-linked rubber (B) and/or the thermoplastic resin (C) and/or the thermoplastic elastomer (D) to improve mechanical properties by utilizing the reactivity of the acrylic block copolymer (A). The lubricant (E) and the inorganic filler (G) are added to the acrylic block copolymer (A) or its composition to decrease the surface frictionality of the acrylic block copolymer (A) or its composition, to improve the mechanical properties such as elastic modulus, and further to improve processability. The stabilizer (G) can be used for preventing thermal deterioration or oxidative deterioration in processing, or improving the heat resistance and weather resistance of products.

The mixing ratios of the acrylic block copolymer (A) to the cross-linked rubber (B), the thermoplastic resin (C) and/or the thermoplastic elastomer (D), and to the lubricant (E) and/or the inorganic filler (F), and/or the stabilizer (G) may be appropriately determined according to the required physical properties of the resultant composition, for example, the characteristics of a seal product, and the like.

When it is necessary to impart rubber elasticity to the acrylic block copolymer (A) or improve the low-temperature properties thereof, or when the acrylic block copolymer (A) is added to the cross-linked rubber in order to impart thermoplasticity thereto, the mixing ratio is preferably 0.5% by weight to 99.5% by weight of the acrylic block copolymer (A) to 99.5% by weight to 0.5% by weight of the cross-linked rubber (B), and more preferably 0.5% by weight to 90% by weight of the acrylic block copolymer (A) to 99.5% by weight to 10% by weight of the cross-linked rubber (B). When the content of the acrylic block copolymer (A) is less than 0.5% by weight, there is the tendency that thermoplasticity is not sufficiently imparted to the cross-linked rubber. When the content of the cross-linked rubber (B) is less than 0.5% by weight, there is the tendency that rubber elasticity is not sufficiently imparted to the acrylic block copolymer (A), and the low-temperature properties are not sufficiently improved.

The mixing ratio of the acrylic block copolymer (A) to the thermoplastic resin (C) and/or the thermoplastic elastomer (D) may be appropriately determined according to demand. The mixing ratio is, without limitation to, preferably 0.5% by weight to 99.5% by weight of the acrylic block copolymer (A) to 99.5% by weight to 0.5% by weight of the thermoplastic resin (C) and/or the thermoplastic elastomer (D), and more preferably 0.5% by weight to 90% by weight of the acrylic block copolymer (A) to 99.5% by weight to 10% by weight of the thermoplastic resin (C) and/or the thermoplastic elastomer (D).

When the thermoplastic resin (C) and/or the thermoplastic elastomer (D) is added to the acrylic block copolymer (A) to control hardness or improve physical properties such as mechanical properties, the content of the acrylic block copolymer (A) is preferably 99.5% by weight to 50% by weight, and the content of the thermoplastic resin (C) and/or the thermoplastic elastomer (D) is preferably 0.5% by weight to 50% by weight. When the content of the thermoplastic resin (C) and/or the thermoplastic elastomer (D) is less than 0.5% by weight, the hardness of the acrylic block copolymer may not be sufficiently controlled, and the physical properties such as mechanical properties may not be sufficiently improved.

When the acrylic block copolymer (A) is added as a softener to the thermoplastic resin (C) and/or the thermoplastic elastomer (D) to control the hardness of the thermoplastic resin (C) and/or the thermoplastic elastomer (D) and improve the compression set thereof while maintaining the high elastic modulus, the content of the acrylic block copolymer (A) is preferably 0.5% by weight to 50% by weight, and the content of the thermoplastic resin (C) and/or the thermoplastic elastomer (D) is preferably 99.5% by weight to 50% by weight. When the content of the acrylic block copolymer (A) is less than 0.5% by weight, the hardness of the thermoplastic resin (C) and/or the thermoplastic elastomer (D) may not be sufficiently controlled, and the physical properties such as mechanical properties may not be sufficiently improved. When the acrylic block copolymer (A) is added as a compatibilizer to at least two types of the cross-linked rubber (B) and/or the thermoplastic resin (C) and/or the thermoplastic elastomer (D) to improve the mechanical properties, the content of the acrylic block copolymer (A) is preferably 0.5% by weight to 20% by weight, and the content of the cross-linked rubber (B) and/or the thermoplastic resin (C) and/or the thermoplastic elastomer (D) is preferably 80% by weight to 99.5% by weight. When the content of the acrylic block copolymer (A) is less than 0.5% by weight, the mechanical properties and compatibility may not be sufficiently improved.

When the lubricant (E), the inorganic filler (F), and the stabilizer (G) are added to the acrylic block copolymer (A) or its composition, the contents of the lubricant (E), the inorganic filler (F), and the stabilizer (G) are preferably 0.01 parts by weight to 50 parts by weight, 0.01 parts by weight to 300 parts by weight, and 0.01 parts by weight to 15 part by weight, respectively, based on 100 parts by weight of the acrylic block copolymer (A) or its composition. More preferably, the contents of the lubricant (E) and the inorganic filler (F) are preferably 0.1 parts by weight to 30 parts by weight and 0.1 parts by weight to 100 parts by weight, respectively, based on 100 parts by weight of the acrylic block copolymer (A) or its composition. When the content of the lubricant (E) is less than 0.01 parts by weight, surface frictionality may not decrease. When the content of the lubricant (E) exceeds 50 parts by weight, the lubricant may bleed out from the acrylic block copolymer (A) or its composition, or oil resistance may deteriorate. When the content of the inorganic filler (F) is less than 0.01 parts by weight, the mechanical properties such as elastic modulus may not be sufficiently improved. When the content of the inorganic filler (F) exceeds 300 parts by weight, tensile elongation may decrease, or compression set may degrade. When the content of the stabilizer (G) is less than 0.01 parts by weight, the effect of preventing heat deterioration and oxidative deterioration in processing and improving the heat resistance and weather resistance of a product may become insufficient. When the content of the stabilizer (G) exceeds 15 parts by weight, the mechanical properties of the acrylic block copolymer (A) or its composition may deteriorate or coloring may occur.

<Cross-linked Rubber (B)>

In the present invention, the cross-linked rubber (B) is vulcanized rubber or core-shell rubber cross-linked with a graft crossing agent or the like. The core-shell type is preferred from the viewpoint of compatibility with the acrylic block copolymer (A).

Examples of the cross-linked rubber (B) include acrylic rubber (ACM), ethylene-acrylate copolymer rubber (AEM), acrylonitrile-acrylate copolymer rubber (ANM), chlorinated polyethylene (CM), chlorosulfonated polyethylene (CSM), ethylene-propylene copolymer rubber (EPM), ethylene-propylene-diene copolymer rubber (EPDM), ethylene-vinyl acetate copolymer rubber (EVA), tetrafluoroethylene-propylene rubber (FEPM), tetrafluoroethylene-propylene-vinylidene fluoride rubber, fluororubber (FKM), polyisobutylene (PIB), epichlorohydrin rubber (CO), acrylate-butadiene rubber (ABR), styrene-butadiene rubber (SBR), butadiene rubber (BR), natural rubber (NR), epoxidized natural rubber (ENR), isoprene rubber (IR), butyl rubber (IIR), brominated butyl rubber (BIIR), chlorinated butyl rubber (CIIR), acrylonitrile-butadiene copolymer rubber (NBR), hydrogenated nitrile rubber (H-NBR), chloroprene rubber, norbornene rubber (NOR), polyester urethane rubber (AU), polyether urethane rubber (EU), silicone rubber (VMQ), fluorosilicone rubber (FVMQ), polydimethylsiloxane (MQ), polysulfide rubber, ethylene-methyl acrylate copolymer rubber (EMA), ethylene-ethyl acrylate copolymer rubber (EEA), and ethylene-methyl methacrylate copolymer rubber (EMMA). Examples of the core-shell type cross-linked rubber having excellent compatibility with other resins include, without limitation to, a methyl methacrylate-butadiene-styrene copolymer (MBS resin), an acrylic graft copolymer, and an acrylic-silicone composite rubber graft copolymer. Commercially available industrial products of the MBS resin include KaneAce B Series and KaneAce M Series (produced by Kanegafuchi Chemical Industry Co., Ltd.). Commercially available industrial products of the acrylic graft copolymer include KaneAce FM Series (produced by Kanegafuchi Chemical Industry Co., Ltd.). Commercially available industrial products of the acrylic-silicone composite rubber graft copolymer include Metablen S-2001 (Mitsubishi Rayon Co., Ltd.).

At least one of these rubber materials may be used. Among these rubber materials, silicone rubber (VMQ) is preferred from the viewpoint of excellent low-temperature properties and high-temperature properties (heat resistance) required for various seal products. Also, core-shell silicone rubber comprising a core made of silicone and a shell made of methyl methacrylate or the like is preferred because it further has mechanical properties. Another rubber having high compatibility with the acrylic block copolymer (A) can also be preferably used.

<Thermoplastic Resin (C)>

Examples of resins usable as the thermoplastic resin (C) in the present invention include, without limitation to, polyvinyl chloride resin, polyethylene resin, polypropylene resin, cyclic olefin copolymer resin, polymethyl methacrylate resin, styrene-methyl methacrylate resin, acrylonitrile-styrene copolymer resin, polystyrene resin, polyphenylene ether resin, polycarbonate resin, polyester resin, polyamide resin, polyacetal resin, polyphenylene sulfide resin, polysulfone resin, polyimide resin, polyetherimide resin, polyether ketone resin, polyetherether ketone resin, and polyamide-imide resin. At least one of these resins can be used. As a nonlimiting example, a resin having high compatibility with the acrylic block copolymer (A) is preferably used, and a resin having a functional group reactive with an acid anhydride group is more preferably used. Examples of a functional group reactive with an acid anhydride group include an amino group and a hydroxyl group. Examples of a thermoplastic resin having such a functional group include polyester resins and polyamide resins. Other thermoplastic resins containing a functional group reactive with an acid anhydride can also be preferably used. Polyvinyl chloride resin, polymethyl methacrylate resin, acrylonitrile-styrene copolymer resin, methyl methacrylate-styrene copolymer resin, and polycarbonate resin have high compatibility with the acrylic block copolymer (A). Therefore, the use of such resins has the effect of improving hardness while maintaining mechanical strength, and acting as a compatibilizer with polyester resin and polyamide resin.

<Thermoplastic Elastomer (D)>

Examples of thermoplastic elastomers usable as the thermoplastic elastomer (D) in the present invention include, without limitation to, a styrene elastomer, an olefin elastomer, an urethane elastomer, a vinyl chloride elastomer, an ester elastomer, an amide elastomer, and an acrylic elastomer. At least one of these elastomers can be used. Among these elastomers, the acrylic elastomer is preferred from the viewpoint of oil resistance, heat resistance, and compatibility, and the ester elastomer and the amide elastomer are preferred from the viewpoint of oil resistance, heat resistance, and the presence of a functional group reactive to an acid anhydride group. Other thermoplastic elastomers having functional groups reactive to an acid anhydride group can also be preferably used. The use of the styrene elastomer, the olefin elastomer, the urethane elastomer, or the vinyl chloride elastomer has the effect of imparting oil resistance, heat resistance, weather resistance, and scratch resistance, and the like while maintaining properties such as rubber elasticity and flexibility.

<Lubricant (E)>

Examples of materials usable as the lubricant (E) in the present invention include fatty acids such as stearic acid and palmitic acid; fatty acid metal salts such as calcium stearate, zinc stearate, magnesium stearate, potassium palmitate, and sodium palmitate; waxes such as polyethylene wax, polypropylene wax, and montan wax; low-molecular-weight polyolefins such as low-molecular-weight polyethylene and low-molecular-weight polypropylene; polyorganosiloxane such as dimethylpolysiloxane; octadecylamine; alkyl phosphates; fatty acid esters; amide lubricants such as ethylene bis-stearylamide; fluororesin powders such as tetrafluoroethylene resin; molybdenum disulfide powders; silicone resin powders; silicone rubber powders; and silica. At least one of these lubricants can be used. Among these lubricants, stearic acid, calcium stearate, zinc stearate, and magnesium stearate are preferred from the viewpoint of cost and excellent processability. When the resultant composition is used for various seal products, stearic acid, zinc stearate, and calcium stearate are preferred from the viewpoint that the required low frictionality can be imparted.

<Inorganic Filler (F)>

Examples of materials usable as the inorganic filler (F) in the present invention include, without limitation to, titanium oxide, zinc sulfide, zinc oxide, carbon black, calcium carbonate, calcium silicate, clay, kaoline, silica, mica powder, alumina, glass fibers, metal fibers, potassium titanate whiskers, asbestos, wollastonite, mica, talc, glass flakes, milled fibers, and metal powders. At least one of these materials can be used. Among these materials, titanium oxide, carbon black, calcium carbonate, silica, and talc are preferred from the viewpoint of improvement in mechanical properties, a reinforcing effect, and cost. When the resultant composition is used for various seal products, carbon black and titanium oxide are preferred from the viewpoint of required high elastic modulus, weather resistance, and usability as pigments.

<Stabilizer (G)>

Examples of materials usable as the stabilizer (G) in the present invention include an antioxidant, a photo stabilizer, and an ultraviolet absorber. Specific examples of the antioxidant include, without limitation to, amine antioxidants such as phenyl-α-naphthylamine (PAN), octyldiphenylamine, N,N'-diphenyl-p-phenylenediamine (DPPD), N,N'-di-β-naphthyl-p-phenylenediamine (DNPD), N-(1,3-dimethylbutyl)-N'-phenyl-p-phenylenediamine, N-phenyl-N'-isopropyl-p-phenylenediamine (IPPN), N,N'-diallyl-p-phenylenediamine, phenothiazine derivatives, diallyl-p-phenylenediamine mixtures, alkylated phenylenediamine, 4,4'-bis(α,α-dimethylbenzyl)diphenylamine, N-phenyl-N'-(3-methacryloyloxy-2-hydropropyl)-p-phenylenediamine, diallylphenylenediamine mixtures, diallyl-p-phenylenediamine mixtures, N-(1-methylheptyl)-N'-phenyl-p-phenylenediamine, and diphenylamine derivatives; imidazole antioxidants such as 2-mercaptobenzoimidazole (MBI); phenolic antioxidants such as 2,6-di-tert-butyl-4-methylphenol and pentaerythrityl tetrakis[3-(5-di-tert-butyl-4-hydroxyphenol)-propionate]; phosphate antioxidants such as nickel diethyl-dithiocarbamate; secondary antioxidants such as triphenyl phosphite; 2-tert-butyl-6-(3-tert-butyl-2-hydroxy-5-methylbenzyl)-4-methylphenyl acrylate; and 2-[1-(2-hydroxy-3,5-di-tert-pentylphenyl)ethyl]-4,6-di-tert-pentylphenyl acrylate. Examples of the photo stabilizer and the ultraviolet absorber include 4-tert-butylphenyl salicylate, 2,4-dihydroxybenzophenone, 2,2'-dihydroxy-4-methoxybenzophenone, ethyl-2-cyano-3,3'-diphenyl acrylate, 2-ethylhexyl-2-cyano-3,3'-diphenyl acrylate, 2-hydroxy-5-chlorobenzophenone, 2-hydroxy-4-methoxybenzophenone-2-hydroxy-4-octoxybenzophenone, monoglycol salicylate, oxalic amide, and 2,2',4,4'-tetrahydroxybenzophenone.

Commercially available industrial products of the antioxidants include Irganox 1010 (produced by Ciba Specialty Chemicals Inc.), Sanol LS770 (produced by Sankyo Lifetech Co., Ltd.), Adekastab LA-57 (produced by Asahi Denka Kogyo K.K.), Adekastab LA-68 (produced by Asahi Denka Kogyo K.K.), Chimassorb 944 (produced by Ciba Specialty Chemicals Inc.), Sanol LS765 (produced by Sankyo Lifetech Co., Ltd.), Adekastab LA-62 (produced by Asahi Denka Kogyo K.K.), TINUVIN 144 (produced by Ciba Specialty Chemicals Inc.), Adekastab LA-63 (produced by Asahi Denka Kogyo K.K.), TINUVIN 622 (produced by Ciba Specialty Chemicals Inc.), Adekastab LA-32 (produced by Asahi Denka Kogyo K.K.), Adekastab LA-36 (produced by Asahi Denka Kogyo K.K.), TINUVIN 571 (produced by Ciba Specialty Chemicals Inc.), TINUVIN 234 (produced by Ciba Specialty Chemicals Inc.), Adekastab LA-31 (produced by Asahi Denka Kogyo K.K.), TINUVIN 1130 (produced by Ciba Specialty Chemicals Inc.), Adekastab AO-20 (produced by Asahi Denka Kogyo K.K.), Adekastab AO-50 (produced by Asahi Denka Kogyo K.K.), Adekastab 2112 (produced by Asahi Denka Kogyo K.K.), Adekastab PEP-36 (produced by Asahi Denka Kogyo K.K.), Sumilizer GM (produced by Sumitomo Chemical Co., Ltd.), Sumilizer GS (produced by Sumitomo Chemical Co., Ltd.), and Sumilizer TP-D (produced by Sumitomo Chemical Co., Ltd.). These antioxidants may be used alone or combination of two or more. Among these antioxidants, Sanol LS770, Irganox 1010, Sumilizer GS, and TINUVIN 234 are preferred from the viewpoint of cost and the effect of preventing thermal and optical deterioration of the acrylic block copolymer.

<Process for Producing Thermoplastic Elastomer Composition>

As a nonlimiting example of a method for processing or producing the acrylic block copolymer (A) of the present invention or a composition comprising the acrylic block copolymer (A) and at least one selected from the group consisting the cross-linked rubber (B) the thermoplastic resin (C), the thermoplastic elastomer (D), the lubricant (E), the inorganic filler (F), and the stabilizer (G), an existing method comprising mechanically mixing with, for example, a Banbury mixer, a roller mill, a kneader, a single-screw or multi-screw extruder, or the like, and then pelletizing the resultant mixture can be used. The kneading temperature may be controlled according to productivity, the melting temperatures of the used components selected from the acrylic block copolymer (A), the cross-linked rubber (B) the thermoplastic resin (C), the thermoplastic elastomer (D), the lubricant (E), the inorganic filler (F), and the stabilizer (G), and the mechanical properties of the resultant acrylic block copolymer (A) or composition. For example, the kneading temperature for production is 100° C. to 300° C., preferably 130° C. to 300° C., and more preferably 150° C. to 250° C. With the kneading temperature lower than 100° C., melting of the acrylic block copolymer (A) may become insufficient, thereby causing nonuniform kneading with the cross-linked rubber (B) the thermoplastic resin (C), the thermoplastic elastomer (D), the lubricant (E), the inorganic filler (F), and the stabilizer (G). With the kneading temperature higher than 300° C., the acrylic block copolymer (A) may be decomposed.

According to demand, a flexibilizer, a flame retardant, a pigment, a mold release agent, an antistatic agent, an antibacterial-antifungal agent, a compatibilizer, and the like may be added to the acrylic block copolymer (A) or the composition comprising the acrylic block copolymer (A) and at least one selected from the group consisting the cross-linked rubber (B), the thermoplastic resin (C), the thermoplastic elastomer (D), the lubricant (E), the inorganic filler (F), and the stabilizer (G). As the additives, optimum additives may be appropriately selected according to the required physical properties and purposes of use.

Examples of the flexibilizer include, without limitation to, compounds such as plasticizers ordinarily added to thermoplastic resins and rubber; softeners such as process oil; oligomers; oils such as animal oil and vegetable oil; petroleum fractions such as kerosene, heavy oil, light oil, and naphtha. Examples of the softeners include process oils, for example, petroleum process oils such as paraffin oil, naphthenic process oil, and aromatic process oil.

Examples of the plasticizers include phthalic acid derivatives such as dimethyl phthalate, diethyl phthalate, di-n-butyl phthalate, di-(2-ethylhexyl) phthalate, diheptyl phthalate, diisodecyl phthalate, di-n-octyl phthalate, diisononyl phthalate, ditridecyl phthalate, octyldecyl phthalate, butylbenzyl phthalate, dicyclohexyl phthalate, and β-hydroxyethyl-2-ethylhexyl phthalate; isophthalic acid derivatives such as dimethyl isophthalate; tetrahydrophthalic acid derivatives such as di-(2-ethylhexyl)tetrahydrophthalic acid; adipic acid derivatives such as dimethyl adipate, dibutyl adipate, di-n-hexyl adipate, di-(2-ethylhexyl) adipate, isononyl adipate, diisodecyl adipate, dibutyl diglycol adipate; azelaic acid derivatives such as di-2-ethylhexyl azelate; sebacic acid derivatives such as dibutyl sebacate; dodecan-2-oic acid derivatives; maleic acid derivatives such as dibutyl maleate and di-2-ethylhexyl maleate; fumaric acid derivatives such as dibutyl fumarate; p-oxybenzoic acid derivatives such as 2-ethylhexyl p-oxybenzoate; trimellitic acid derivatives such as tris-2-ethylhexyl trimellitate; pyromellitic acid derivatives; citric acid derivatives such as acetyl tributyl citrate; itaconic acid derivatives; oleic acid derivatives; ricinoleic acid derivatives; stearic acid derivatives; other fatty acid derivatives; sulfonic acid derivatives; phosphoric acid derivatives; glutaric acid derivatives; polyester plasticizers each comprising a polymer of a dibasic acid such as adipic acid, azelaic acid, phthalic acid, or the like, glycol, and a monohydric alcohol; glycol derivatives; glycerin derivatives; paraffin derivatives such as chlorinated paraffin; epoxy derivative polyester polymer plasticizers; polyether polymer plasticizers; carbonate derivatives such as ethylene carbonate and propylene carbonate; sulfonamide derivatives such as N-butylbenzenesulfonamide, N-ethyltoluenesulfonamide and N-cyclohexyltoluenesulfonamide; and vinyl polymers such as acrylic plasticizers produced by polymerizing vinyl monomers by various methods. In the present invention, the plasticizer is not limited to these plasticizers, and various plasticizers can be used. Also, commercially available plasticizers for rubber or thermoplastic resins can be used. Examples of the commercially available plasticizers include Thiokol TP (produced by Morton Corporation), Adekacizer O-130P, C-79, UL-100, P-200, and RS-735 (produced by Asahi Denka Co., Ltd.), Sansocizer N-400 (produced by Shin-Nippon Rika Co., Ltd.), BM-4 (produced by Daihachi Chemical Industry Ltd.), EHPB (Ueno Fine Chemicals Industry, Ltd.), and UP-1000 (produced by Toagosei Co., Ltd.). Examples of vegetable oil include castor oil, cottonseed oil, linseed oil, rapeseed oil, soybean oil, palm oil, coconut oil, peanut oil, pine oil, and tall oil.

The flexibilizer used preferably has excellent affinity for the acrylic block copolymer (A), the cross-linked rubber (B), the thermoplastic resin (C), and the thermoplastic elastomer (D). Preferred examples of such a flexibilizer include, without limitation to, low-volatile plasticizers causing small heating losses, such as adipic acid derivatives, phthalic aid derivatives, glutaric acid derivatives, trimellitic acid derivatives, pyromellitic acid derivatives, polyester plasticizers, glycerin derivatives, epoxy derivative polyester polymer plasticizers, polyether polymer plasticizers, and acrylic plasticizers. At least one of these flexibilizers can be used.

Examples of the flame retardant include, without limitation to, compounds such as triphenyl phosphate, tricresyl phosphate, decabromobiphenyl, decabromobiphenyl ether, and antimony trioxide. These compounds may be used alone or in combination of two or more.

Examples of the pigment include, without limitation to, compounds such as titanium oxide, zinc sulfide, and zinc oxide. These compounds may be used alone or in combination of two or more.

Commercially available products of the compatibilizer include Kraton Series (produced by Shell Japan Co.,), Tuftec Series (produced by Asahi Chemical Industry Co.,), Dynaron (produced by Nippon Synthetic Rubber K.K.), Epofriend (produced by Daicel Chemical Industries Ltd.), Septon (produced by Kuraray Co., Ltd.), Nofalloy (produced by NOF Corporation), Rexpearl (Nippon Polyolefin Co., Ltd.), Bondfast (produced by Sumitomo Chemical Co., Ltd.), Bondine (Sumitomo Chemical Co., Ltd.), Admer (Mitsui Chemicals, Inc.), Youmex (Produced by Sanyo Chemical Industries, Ltd.), VMX (produced by Mitsubishi Chemical Corporation), Modiper (produced by NOF Corporation), Staphyloid (Takeda Chemical Industries, Ltd.), and Reseda (Toagosei Co., Ltd.).

As the acrylic block copolymer (A) of the present invention, acrylic block copolymers having hardness in a wide range can be produced by controlling the types of the constituent monomers and the composition ratio between the methacrylic polymer block (a) and the acrylic polymer block (b). When an acrylic block copolymer having low hardness and flexibility is produced in the form of a powder or pellets, blocking may occur. Therefore, when the composition comprising the acrylic block copolymer (A) and at least one selected from the group consisting of the cross-linked rubber (B), the thermoplastic resin (C), the thermoplastic elastomer (D), the lubricant (E), the inorganic filler (F), and the stabilizer (G) is produced in the form of a powder or pellet, any of various anti-blocking agents may be coated for preventing blocking. Specific examples of the anti-blocking agent include the lubricant (E), calcium carbonate, talc, kaoline, alumina, aluminum hydroxide, and acrylic polymer fine particles. At least one selected from these compounds is preferably used. In view of cost, calcium carbonate and talc are preferred. In particular, when the methacrylic polymer block (a) of a methacrylic block copolymer comprises methyl methacrylate as a main component, a polymethyl methacrylate resin powder is preferably used as the anti-blocking agent because the addition of the anti-blocking agent possibly has substantially no influence on the physical properties of products.

In the present invention, the anti-blocking agent may be added to a powder or pellets by a method in which the powder or pellets are produced without the anti-blocking agent, and then the anti-blocking agent is applied to the powder or pellets, or a method in which the anti-blocking agent is coated during production of the powder or pellets.

Examples of the method in which the pellets are produced without the anti-blocking agent, and then the anti-blocking agent is coated to the pellets include a method of dispersing the polymer pellets in a solvent containing the anti-blocking agent, a method of spraying a solvent containing the anti-blocking agent to the pellets, and a method of directly mixing the pellets and the anti-blocking agent. Examples of the method in which the anti-blocking agent is coated during production of the pellets include an underwater cutting method and a strand cutting method. In the underwater cutting method for producing the pellets, it is necessary to prevent blocking of the pellets near a die or a cutter in some cases. In this case, a polymer is cut in circulating cooling water, and thus a blocking property can be improved by adding at least one anti-blocking agent to the circulating cooling water. In the strand cutting method, generally, a resin discharged from the die reaches a high temperature, and thus a strand is cooled with an aqueous phase to solidify the resin before cutting. Therefore, the anti-blocking agent is previously added to the aqueous phase and dispersed therein, and the strand is immersed in the aqueous phase to coat the anti-blocking agent on the surface. In this case, the effect of preventing blocking of the pellets can be exhibited.

<Automobile, Electric and Electronic Parts>

The acrylic block copolymer (A) of the present invention and the composition comprising the acrylic block copolymer (A) and at least one selected from the group consisting of the cross-linked rubber (B), the thermoplastic resin (C), the thermoplastic elastomer (D), the lubricant (E), the inorganic filler (F), and the stabilizer (G) are improved in oil resistance, heat resistance, thermal decomposition resistance, weather resistance, mechanical properties, compression set, etc. while maintaining the characteristics inherent to acrylic block copolymers. Therefore, the acrylic block copolymer (A) and the composition can be more preferably used for automobile, electric and electronic parts, for example, seal products for automobiles, seal products for home electric appliances, and seal products for office appliances. The seal products according to the present invention are excellent in oil resistance and heat resistance, and excellent in simplification of the molding process and recycling property as compared with conventional seal products, for example, vulcanized rubber products. The seal products are also excellent in oil resistance and weather resistance as compared with olefin thermoplastic elastomers.

Specific examples of such parts include various types of oil seals such as an oil seal and a reciprocation oil seal; various types of packings such as a ground packing, a lip packing, and a squeeze packing; various types of boots such as a constant velocity joint boot, a strut boot, a rack and pinion boot, a brake booster boot, a steering ball joint boot; various types of dust covers such as a suspension dust cover, a suspension tie-rod dust cover, and a stabilizer tie-rod dust cover; various types of gaskets such as a resin intake manifold gasket, a throttle-body gasket, a power-steering vane pump gasket, a head-cover gasket, a water heater self-priming pump gasket, a filter gasket, a pipe joint (ABS & HBB) gasket, a HDD top-cover gasket, a HDD connector gasket, a cylinder-head gasket combined with a metal, a car cooler compressor gasket, a gasket around an engine, an AT separate plate, and general-purpose gaskets (industrial sewing machine, a nailing machine, and the like); various types of valves such as a needle valve, a plunger valve, a water/gas valve, a brake valve, a drinking valve, and a safety valve for an aluminum electrolytic capacitor; various types of stopper mainly having a buffer function, such as a diaphragm for a vacuum booster or water and gas, a seal washer, a bore plug, and a high-precision stopper; and precision seal rubbers such as a plug tube seal, an injection pipe seal, an oil receiver, a brake drum seal, a shading seal, a plug seal, a connector seal, and a keyless entry cover. Other examples of seal products include various types of weatherstrips such as a weatherstrip for automobile parts, a trunk seal, and a glass run channel.

In addition to the automobile, electric and electronic parts, the acrylic block copolymer (A) and the composition comprising the acrylic block copolymer (A) and at least one selected from the group consisting of the cross-linked rubber (B), the thermoplastic resin (C), the thermoplastic elastomer (D), the lubricant (E), the inorganic filler (F), and the stabilizer (G) can be preferably used in the fields of package materials, construction and civil engineering, miscellaneous goods, and the like. For example, the acrylic block copolymer (A) and the composition can be widely used for a hose, a sheet, a film material, a damping material, a vibration proof material, a grip, a buffer, a base polymer of an adhesive, a resin modifier, and the like.

The above-described products can be molded by any desired molding method such as extrusion molding, compression molding, blow molding, calender molding, vacuum molding, foam molding, injection molding, powder slash molding, injection blowing, or the like using the acrylic block copolymer (A) or the composition thereof. Among these methods, injection molding is preferred from the viewpoint of simplicity.

Although the present invention will be described in detail below on the basis of examples, the present invention is not limited to these examples.

In the examples, BA, EA, MEA, 2EHA, MMA, TBMA, and TBA represent n-butyl acrylate, ethyl acrylate, 2-methoxyethyl acrylate, 2-ethylhexyl acrylate, methyl methacrylate, tert-butyl methacrylate, and tert-butyl acrylate, respectively.

<Test Method>

(Molecular Weight)

In each of the examples, a molecular weight was determined in terms of polystyrene by GPC measurement using a GPC analyzer, chloroform as a mobile phase, and a polystyrene gel column. The GPC measurement was performed using the GPC analyzer (system: GPC system produced by Waters Corporation, column: Shodex K-804 (polystyrene gel) produced by Showa Denko K.K.) and chloroform as the mobile phase. The molecular weight was determined in terms of polystyrene.

(Analysis of Conversion to Acid Anhydride Group)

Reaction of conversion to an acid anhydride group in an acrylic block copolymer was confirmed by an infrared spectrum (FTIR-8100 produced by Shimadzu Corporation) and nuclear magnetic resonance (AM400 produced by BRUKER Corporation).

As a measurement solvent for nuclear magnetic resonance analysis, deuterochloroform was used for a block having a carboxylic acid ester, and deuteroacetone was used for a block containing an acid anhydride group.

(Analysis of Conversion to Carboxyl Group)

Reaction of conversion to a carboxyl group in an acrylic block copolymer was confirmed by an infrared spectrum (FTIR-8100 produced by Shimadzu Corporation) and nuclear magnetic resonance (AM400 produced by BRUKER Corporation).

As a measurement solvent for nuclear magnetic resonance analysis, deuterochloroform was used for a block having a carboxylic ester, and deuteromethanol was used for a block containing a carboxyl group.

(Hardness)

Hardness at 23° C. (initial value, according to JIS A) was measured according to JIS K6253. However, when hardness measured by a type A durometer was over 90, the hardness was measured by a type D durometer (JIS D).

(Mechanical Strength)

According to the method of JIS K7113, mechanical strength was measured by AG-10TB model autograph produced by Shimadzu Corporation. Measurement was performed with n=3, and averages of strength (MPa) and elongation (%) at breakage of a specimen were used. The specimen had a shape of No. 2(1/3) having a thickness of about 2 mm. A test was carried out at 23° C. and a test rate of 500 mm/min. As a rule, the specimen was conditioned at a temperature of 23±2° C. and relative humidity of 50±5% for 48 hours or more before the test.

(Compression Set)

According to JIS K6301, a cylindrical molded product was maintained with a compression rate of 25% at 70° C., 100° C., or 120° C. for 22 hours or 72 hours, and then allowed to stand at 23° C. for 30 minutes. Then, the thickness of the molded product was measured to calculate residual strain. Namely, a compression set of 0% corresponds to complete recovery of strain, and a compression set of 100% corresponds to no recovery of strain.

(Oil Resistance)

According to ASTM D638, a molded product was maintained in ASTM No. 3 oil kept at 150° C. for 72 hours to determine a rate of weight change (% by weight).

The shape after immersion in oil was evaluated based on the following criteria:

Shape: maintained=○, slightly swollen=○~Δ, swollen=Δ, significantly swollen or partially dissolved=×, completely dissolved=××

(Heat Resistance)

Heat resistance was evaluated by comparison of flow beginning temperatures. A flow beginning temperature was measured by extruding a resin from a nozzle having an inner diameter of 1 mm and a length of 10 mm under a load of 60 Kgf/cm$^2$ while heating the resin at a heating rate of 5° C./min using a Kokashiki flow tester CFT-500C model produced by Shimadzu Corporation. The temperature at start of lowering of a resin extrusion piston of the flow tester (indicated by Tfb in the measuring meter) was regarded as the flow beginning temperature.

(Thermogravimetric Analysis)

The thermal decomposition resistance of an acrylic block copolymer was measured with a differential thermogravimetric simultaneous measurement apparatus (DTG-50) produced by Shimadzu Corporation. Measurement was performed under a nitrogen stream at a flow rate of 50.0 ml/min and a heating rate of 10.0° C./min. The 5% weight loss temperature was determined on the basis of the weight at 100° C.

(Insoluble Content Ratio (% by Weight))

In order to measure an insoluble content ratio, 1 g (Wu) of a sample was covered with a 100-mesh wire gauze and immersed in toluene at 80° C. or acetone 60° C. for 24 hours (toluene or acetone in which an acrylic block copolymer was soluble was selected), and a toluene or acetone soluble content was separated. Then, the residual solid was dried under vacuum at 60° C., and the weight g (Wc) of the residual solid after drying was measured. The insoluble content ratio was determined from the weight of the residual solid (Wc) relative to 1 g (Wu) of the sample. The progress of reaction can be confirmed by the insoluble content ratio (% by weight).

(Frictionality)

In order to measure frictionality due to friction between samples of the same material according to JIS K7215, a dynamic coefficient of friction was determined by SURFACE PROPERTY TESTER (produced HEIDON Corporation, TYPE: 14DR) using a test piece having a shape of 80×200 mm and a counter piece having a shape of 20×20 mm, both pieces being cut out of a sheet having a thickness of 2 mm. A test was performed at a load of 100 gf and a rate of 50 mm/min. When frictionality could not be measured because of high tackiness, frictionality was evaluated as ×.

(Recycling Property)

A sheet formed for evaluating the tensile properties and the like was again milled and kneaded by Labo Plastomill (produced by Toyo Seiki Co., Ltd.) at a temperature of processing for producing the sheet, and then pressed at each of temperatures.

When the sheet similar to that before kneading was obtained, the recycling property was evaluated as good (○) When the sheet similar to that before kneading was not be obtained, the recycling property was evaluated as bad (×).

(Low-temperature Brittleness)

According to JIS K7216, a sample of 38×6 mm was cut out from a molded sheet of 2 mm in thickness, and the low-temperature brittle temperature was measured by a low-temperature brittle temperature measuring device (Toyo Seiki Co., Ltd.).

(Processability)

A molded sheet of 2 mm in thickness produced for evaluating the tensile properties and the like was cut into pellets, and the processing temperature was measured with melt viscosity (1500 poise) by Capilograph (produced by Toyo Seiki Co., Ltd.). Measurement was performed under the conditions of a capillary length of 10 mm, a capillary diameter of 1 mm, and a barrel diameter of 9.55 mm.

<Production of Acrylic Block Copolymer>

PRODUCTION EXAMPLE 1

Synthesis of (MMA-co-TBMA)-b-BA-b-(MMA-co-TBMA) (MMA/TBMA=50/50 mol %, BA/(MMA-co-TBMA)=70/30% by Weight) Acrylic Block Copolymer (Referred to as "50TBA7" Hereinafter)

The procedures below were preformed for producing 50TBA7. The air in a 5-L separable flask used as a polymerization vessel was replaced by nitrogen, and 11.3 g (78.5 mmol) of copper bromide and 180 mL of acetonitrile (bubbled with nitrogen) were added to the flask. After stirring under heating at 70° C. for 30 minutes, 5.65 g (15.7 mmol) of diethyl 2,5-dibromoadipate serving as an initiator and 900 ml (6.28 mol) of BA were added to the flask. The resultant mixture was stirred under heating at 85° C., and 1.64 ml (7.85 mmol) of diethylenetriamine was added as a ligand to initiate polymerization.

After the initiation of polymerization, 0.2 mL of a solution was sampled from the polymerization solution with predetermined time intervals, and the BA conversion rate was determined by gas chromatographic analysis of the sampled solution. The polymerization rate was controlled by adding triamine at any desired time. At a BA conversion rate of 95%, 351 ml (2.16 mol) of TBMA, 232 ml (2.16 mol) of MMA, 7.77 g (78.5 mmol) of copper chloride, 1.64 ml (7.85 mmol) of diethylenetriamine, and 1148 ml of toluene (bubbled with nitrogen) were added to the reaction solution. Similarly, the conversion rates of TBMA and MMA were determined. At a TBMA conversion rate of 70% and an MMA conversion rate of 62%, 1500 ml of toluene was added to the reaction solution, and the reactor was cooled in a water bath to terminate the reaction.

The reaction solution was diluted with 2.0 L of toluene, and then 17.9 g of p-toluenesulfonic acid monohydrate was added to the reaction solution, followed by stirring at room temperature for 3 hours. Then, 12.0 g of Kyowaad 500SH (produced by Kyowa Chemical Industry Co., Ltd.) was added as an adsorbent to the polymer solution, followed by further stirring at room temperature for 3 hours. Then, the adsorbent was filtered off with a Kiriyama funnel to produce a colorless transparent polymer solution. The resultant solution was dried to remove the solvent and the residual monomers, and thereby the target acrylic block copolymer 50TBA7 was obtained.

GPC analysis of the resultant acrylic block copolymer 50TBA7 showed a number-average molecular weight Mn of 108,240 and a molecular weight distribution Mw/Mn of 1.49.

PRODUCTION EXAMPLE 2

Synthesis of (MMA-co-TBMA)-b-BA-b-(MMA-co-TBMA) (MMA/TBMA=95/5 mol %, BA/(MMA-co-TBMA)=70/30% by Weight) Acrylic Block Copolymer (Referred to as "5TBA7" Hereinafter)

The target acrylic block copolymer 5TBA7 was produced by the same method as in Production Example 1 except the following procedures: In a 5-L separable flask, 5.80 g (16.1 mmol) of diethyl 2,5-dibromoadipate and 900 ml (6.28 mol) of BA were charged and subjected to polymerization. At a BA conversion rate of 95%, 40.9 ml (0.25 mol) of TBMA and 512.6 ml (4.82 mol) of MMA were added to the reaction solution. At a TBMA conversion rate of 60% and an MMA conversion rate of 57%, the reaction was terminated.

GPC analysis of the resultant acrylic block copolymer 5TBA7 showed a number-average molecular weight Mn of 107,312 and a molecular weight distribution Mw/Mn of 1.58.

PRODUCTION EXAMPLE 3

Synthesis of (MMA-co-TBMA)-b-BA-b-(MMA-co-TBMA) (MMA/TBMA=80/20 mol %, BA/(MMA-co-TBMA)=70/30% by Weight) Acrylic Block Copolymer (Referred to as "20TBA7" Hereinafter)

The target acrylic block copolymer 20TBA7 was produced by the same method as in Production Example 1 except the following procedures: In a 5-L separable flask, 5.65 g (15.7 mmol) of diethyl 2,5-dibromoadipate and 900 ml (6.28 mol) of BA were charged and subjected to polymerization. At a BA conversion rate of 95%, 151.9 ml (0.94 mol) of TBMA and 400.9 ml (3.77 mol) of MMA were added to the reaction solution. At a TBMA conversion rate of 70% and an MMA conversion rate of 64%, the reaction was terminated.

GPC analysis of the resultant acrylic block copolymer 20TBA7 showed a number-average molecular weight Mn of 122,858 and a molecular weight distribution Mw/Mn of 1.46.

PRODUCTION EXAMPLE 4

Synthesis of TBMA-b-BA-b-TBMA (BA/TBMA=70/30% by Weight) Acrylic Block Copolymer (Referred to as "100TBA7" Hereinafter)

The target acrylic block copolymer 100TBA7 was produced by the same method as in Production Example 1 except the following procedures: In a 2-L separable flask, 2.26 g (6.3 mmol) of diethyl 2,5-dibromoadipate and 360 ml (2.51 mol) of BA were charged and subjected to polymerization. At a BA conversion rate of 95%, 243 ml (1.50 mol) of TBMA was added to the reaction solution. At a TBMA conversion rate of 70% and an MMA conversion rate of 68%, the reaction was terminated.

GPC analysis of the resultant acrylic block copolymer 100TBA7 showed a number-average molecular weight Mn of 95,491 and a molecular weight distribution Mw/Mn of 1.44.

PRODUCTION EXAMPLE 5

Synthesis of (MMA-co-TBMA)-b-(BA-co-EA-co-MEA)-b-(MMA-co-TBMA) (MMA/TBMA=95/5 mol %, (BA-co-EA-co-MEA)/(MMA-co-TBMA)= 70/30% by Weight) Acrylic Block Copolymer (Referred to as "5T3A7" Hereinafter)

The target acrylic block copolymer 5T3A7 was produced by the same method as in Production Example 1 except the following procedures: In a 5-L separable flask, 6.04 g (16.8 mmol) of diethyl 2,5-dibromoadipate, 362 ml (2.52 mol) of BA, 344 ml (3.17 mol) of EA, and 195 ml (1.51 mol) of MEA were charged and subjected to polymerization. At a BA conversion rate of 95%, an EA conversion rate of 95%, and an MEA conversion rate of 97%, 42.5 ml (0.26 mol) of TBMA and 534 ml (5.02 mol) of MMA were added to the reaction solution. At a TBMA conversion rate of 63% and an MMA conversion rate of 58%, the reaction was terminated.

GPC analysis of the resultant acrylic block copolymer 5T3A7 showed a number-average molecular weight Mn of 12,400 and a molecular weight distribution Mw/Mn of 1.45.

PRODUCTION EXAMPLE 6

Synthesis of (MMA-co-TBMA)-b-(BA-co-EA-co-MEA)-b-(MMA-co-TBMA) (MMA/TBMA=80/20 mol %, (BA-co-EA-co-MEA)/(MMA-co-TBMA)= 70/30% by Weight) Acrylic Block Copolymer (Referred to as "20T3A7" Hereinafter)

The target acrylic block copolymer 20T3A7 was produced by the same method as in Production Example 1 except the following procedures: In a 5-L separable flask, 5.89 g (16.4 mmol) of diethyl 2,5-dibromoadipate, 362 ml (2.52 mol) of BA, 344 ml (3.17 mol) of EA, and 195 ml (1.51 mol) of MEA were charged and subjected to polymerization. At a BA conversion rate of 95%, an EA conversion rate of 95%, and an MEA conversion rate of 97%, 158 ml (0.98 mol) of TBMA and 418 ml (3.92 mol) of MMA were added to the reaction solution. At a TBMA conversion rate of 64% and an MMA conversion rate of 59%, the reaction was terminated.

GPC analysis of the resultant acrylic block copolymer 20T3A7 showed a number-average molecular weight Mn of 111,000 and a molecular weight distribution Mw/Mn of 1.47.

PRODUCTION EXAMPLE 7

Synthesis of (MMA-co-TBMA)-b-(BA-co-EA-co-MEA)-b-(MMA-co-TBMA) (MMA/TBMA=80/20 mol %, (BA-co-EA-co-MEA)/(MMA-co-TBMA)= 60/40% by Weight) Acrylic Block Copolymer (Referred to as "20T3A6" Hereinafter)

The target acrylic block copolymer 20T3A6 was produced by the same method as in Production Example 1 except the following procedures: In a 5-L separable flask, 5.31 g (14.8 mmol) of diethyl 2,5-dibromoadipate, 281 ml (1.96 mol) of BA, 267 ml (2.47 mol) of EA, and 151 ml (1.18 mol) of MEA were charged and subjected to polymerization. At a BA conversion rate of 95%, an EA conversion rate of 95%, and an MEA conversion rate of 97%, 193 ml (1.20 mol) of TBMA and 509 ml (4.78 mol) of MMA were added to the reaction solution. At a TBMA conversion rate of 64% and an MMA conversion rate of 61%, the. reaction was terminated.

GPC analysis of the resultant acrylic block copolymer 20T3A6 showed a number-average molecular weight Mn of 118,927 and a molecular weight distribution Mw/Mn of 1.49.

PRODUCTION EXAMPLE 8

Synthesis of (MMA-co-TBMA)-b-(BA-co-EA-co-MEA)-b-(MMA-co-TBMA) (MMA/TBMA=50/50 mol %, (BA-co-EA-co-MEA)/(MMA-co-TBMA)= 60/40% by Weight) Acrylic Block Copolymer (Referred to as "50T3A6" Hereinafter)

The target acrylic block copolymer 50T3A6 was produced by the same method as in Production Example 1 except the following procedures: In a 5-L separable flask, 5.31 g (14.8 mmol) of diethyl 2,5-dibromoadipate, 281 ml (1.96 mol) of BA, 267 ml (2.47 mol) of EA, and 151 ml (1.18 mol) of MEA were charged and subjected to polymerization. At a BA conversion rate of 95%, an EA conversion rate of 95%, and an MEA conversion rate of 98%, 435 ml (2.70 mol) of TBMA and 287 ml 2.70 mol) of MMA were added to the reaction solution. At a TBMA conversion rate of 67% and an MMA conversion rate of 59%, the reaction was terminated.

GPC analysis of the resultant acrylic block copolymer 50T3A6 showed a number-average molecular weight Mn of 96,778 and a molecular weight distribution Mw/Mn of 1.46.

PRODUCTION EXAMPLE 9

Synthesis of TBMA-b-(BA-co-EA-co-MEA)-b-TBMA ((BA-co-EA-co-MEA)/TBMA=60/40% by Weight) Acrylic Block Copolymer (Referred to as "100T3A6" Hereinafter)

The target acrylic block copolymer 100T3A6 was produced by the same method as in Production Example 1 except the following procedures: In a 5-L separable flask, 5.69 g (15.8 mmol) of diethyl 2,5-dibromoadipate, 301 ml (2.10 mol) of BA, 286 ml (2.64 mol) of EA, and 162 ml (1.26 mol) of MEA were charged and subjected to polymerization. At a BA conversion rate of 96%, an EA conversion rate of 96%, and an MEA conversion rate of 98%, 636 ml (3.94 mol) of TBMA was added to the reaction solution. At a TBMA conversion rate of 77%, the reaction was terminated.

GPC analysis of the resultant acrylic block copolymer 100T3A6 showed a number-average molecular weight Mn of 90,416 and a molecular weight distribution Mw/Mn of 1.43.

PRODUCTION EXAMPLE 10

Synthesis of TBMA-b-(BA-co-MEA)-b-TBMA (BA/MEA=50/50 mol %, (BA-co-MEA)/ TBMA=60/40 (% by Weight)) Block Copolymer (Referred to as "100T2A6" Hereinafter)

The target block copolymer 100T2A6 was produced by the same method as in Production Example 1 except the following procedures: In a 5-L separable flask, 5.45 g (15.1 mmol) of diethyl 2,5-dibromoadipate, 369 ml (2.57 mol) of BA, and 331 ml (2.57 mol) of MEA were charged and subjected to polymerization. At a BA conversion rate of 94% and an MEA conversion rate of 97%, 503 ml (3.10 mol) of TBMA was added to the reaction solution. At a TBMA conversion rate of 72%, the reaction was terminated.

GPC analysis of the resultant block copolymer 100T2A6 showed a number-average molecular weight Mn of 80,400 and a molecular weight distribution Mw/Mn of 1.55.

PRODUCTION EXAMPLE 11

Synthesis of (MMA-co-TBMA)-b-(BA-co-MEA)-b-(MMA-co-TBMA) (MMA/TBMA=60/40 mol %, BA/MEA=67/33 mol %, (BA-co-MEA)/(MMA-co-TBMA)=65/35% by Weight) Block Copolymer (Referred to as "40T2A'6.5" Hereinafter)

The target block copolymer 40T2A'6.5 was produced by the same method as in Production Example 1 except the following procedures: In a 5-L separable flask, 5.34 g (14.8 mmol) of diethyl 2,5-dibromoadipate, 518 ml (3.61 mol) of BA, and 232 ml (1.80 mol) of MEA were charged and subjected to polymerization. At a BA conversion rate of 95% and an MEA conversion rate of 97%, 311 ml (1.93 mol) of TBMA and 308 ml (2.90 mol) of MMA were added to the reaction solution. At a TBMA conversion rate of 68% and an MMA conversion rate of 62%, the reaction was terminated.

GPC analysis of the resultant block copolymer 40T2A'6.5 showed a number-average molecular weight Mn of 102,500 and a molecular weight distribution Mw/Mn of 1.36.

PRODUCTION EXAMPLE 12

Synthesis of (MMA-co-TBMA)-b-(BA-co-2EHA)-b-(MMA-co-TBMA) (MMA/TBMA=50/50 mol %, BA/2EHA=70/30% by Weight, (BA-co-2EHA)/(MMA-co-TBMA)=80/20% by Weight) Acrylic Block Copolymer (Referred to as "50TEBA8" Hereinafter)

The target block copolymer 50TEBA8 was produced by the same method as in Production Example 1 except the following procedures: In a 5-L separable flask, 5.55 g (15.4 mmol) of diethyl 2,5-dibromoadipate, 696 ml (4.85 mol) of BA, and 304 ml (1.46 mol) of 2EHA were charged and subjected to polymerization. At a BA conversion rate of 95% and a 2EHA conversion rate of 95%, 126 ml (1.39 mol) of TBMA and 124 ml (1.39 mol) of MMA were added to the reaction solution. At a TBMA conversion rate of 83% and an MMA conversion rate of 80%, the reaction was terminated.

GPC analysis of the resultant acrylic block copolymer 50TEBA8 showed a number-average molecular weight Mn of 95,830 and a molecular weight distribution Mw/Mn of 1.34.

PRODUCTION EXAMPLE 13

Synthesis of MMA-BA-MMA (BA/MMA =70/30% by Weight) Acrylic Block Copolymer (Referred to as "BA7" Hereinafter)

The procedures below were performed for producing BA7.

The air in a 5-L separable flask used as a polymerization vessel was replaced by nitrogen, and 11.3 g (78.5 mmol) of copper bromide and 180 mL of acetonitrile (dried over molecular sieve 3A and then bubbled with nitrogen) were added to the flask. After stirring under heating at 70° C. for 5 minutes, the temperature was returned to room temperature, and then 5.7 g (15.7 mmol) of diethyl 2,5-dibromoadipate serving as an initiator and 804.6 g (900.0 ml) of n-butyl acrylate were added to the flask. The resultant mixture was stirred under heating at 80° C., and 1.6 ml (7.9 mmol) of diethylenetriamine was added as a ligand to initiate polymerization. After the initiation of polymerization, about 0.2 mL of a solution was sampled from the polymerization solution with predetermined time intervals, and the conversion rate of butyl acrylate was determined by gas chromatographic analysis of each sampled solution. The polymerization rate was controlled by adding triamine at any desired time. At a conversion rate of n-butyl acrylate of 95%, 345.7 g (369.3 ml) of methyl methacrylate, 7.8 g (78.5 mmol) of copper chloride, 1.6 ml (7.9 mmol) of diethylenetriamine, and 1107.9 ml of toluene (dried over molecular sieve 3A and then bubbled with nitrogen) were added to the reaction solution. Similarly, the conversion rate of methyl methacrylate was determined. At a conversion rate of methyl methacrylate of 85% and a conversion rate of n-butyl acrylate of 98%, 1500 ml of toluene was added to the reaction solution, and the reactor was cooled in a water bath to terminate the reaction. The polymerization solution was constantly green during the reaction.

The reaction solution was diluted with 4000 mL of toluene, and then 22.1 g of p-toluenesulfonic acid monohydrate was added to the reaction solution, followed by stirring at 23° C. for 3 hours. The insoluble precipitate was filtered off with a Kiriyama funnel, and then 9.7 g of Kyowaad 500SH was added as an adsorbent to the resultant polymer solution, followed by further stirring at 23° C. for 3 hours. Then, the adsorbent was filtered off with a Kiriyama funnel to produce a colorless transparent polymer solution. The resultant solution was dried to remove the solvent and the residual monomers, and thereby the target acrylic block copolymer BA7 was obtained.

GPC analysis of the resultant acrylic block copolymer BA7 showed a number-average molecular weight Mn of 119,200 and a molecular weight distribution Mw/Mn of 1.51. Also, NMR analysis of the composition showed that BA/MMA=72/28 (% by weight).

PRODUCTION EXAMPLE 14

Synthesis of MMA-b-(BA-co-EA-co-MEA)-b-MMA ((BA-co-EA-co-MEA)/MMA=70/30% by Weight) Acrylic Block Copolymer (Referred to as "3A7" Hereinafter)

The procedures below were performed for producing 3A7.

The air in a 500-mL separable flask used as a polymerization vessel was replaced by nitrogen, and 1.37 g (9.5 mmol) of copper bromide, 20 mL of acetonitrile (bubbled with nitrogen), 0.69 g (1.9 mmol) of diethyl 2,5-dibromoadipate serving as an initiator, 40.2 ml (280 mmol) of BA, 38.2 ml (352 mmol) of EA, and 21.6 ml (168 mmol) of MEA were added to the flask by the same procedures as in Example 1. Then, 0.20 ml (1.0 mmol) of diethylenetriamine was added as a ligand to initiate polymerization.

At a BA conversion rate of 95%, an EA conversion rate of 95%, and an MEA conversion rate of 96%, 42.8 ml (400 mmol) of MMA, 1.82 g (18.5 mmol) of copper chloride, 0.20 ml (1.0 mmol) of diethylenetriamine, and 128.5 ml of toluene (bubbled with nitrogen) were added to the reaction solution. At a BA conversion rate of 97%, an EA conversion rate of 97%, and an MEA conversion rate of 98%, and an MMA conversion rate of 82%, 150 ml of toluene was added to the reaction solution, and the reactor was cooled in a water bath to terminate the reaction.

The reaction solution was diluted with 400 mL of toluene, and then 2.21 g of p-toluenesulfonic acid monohydrate was added to the reaction solution, followed by stirring at 23° C. for 3 hours. The insoluble precipitate was filtered off with a Kiriyama funnel, and then 0.97 g of Kyowaad 500SH was added as an adsorbent to the resultant polymer solution, followed by further stirring at 23° C. for 3 hours. Then, the adsorbent was filtered off with a Kiriyama funnel to produce a colorless transparent polymer solution. The resultant solution was dried to remove the solvent and the residual monomers, and thereby the target acrylic block copolymer 3A7 was obtained.

GPC analysis of the resultant acrylic block copolymer showed a number-average molecular weight Mn of 113,000 and a molecular weight distribution Mw/Mn of 1.49. Also, NMR analysis of the composition showed that EA/BA/MEA/MMA=24/33/15/28 (% by weight).

PRODUCTION EXAMPLE 15

Synthesis of MMA-b-(BA-co-MEA)-b-MMA (BA/ MEA=67/33 mol %, (BA-co-MEA)/MMA =65/35% by Weight) Block Copolymer (Referred to as "2A'6.5" Hereinafter)

The air in a 5-L separable flask was replaced by nitrogen, and 10.4 g (72.2 mmol) of copper bromide, 10.4 g (28.9 mmol) of diethyl 2,5-dibromoadipate, 691 ml (4.82 mol) of BA, 309 ml (2.41 mol) of MEA, and 100 ml (1.91 mol) of acetonitrile were added to the flask, followed by stirring under heating at 85° C. for 30 minutes. Then, 1.64 ml (7.85 mmol) of diethylenetriamine was added as a ligand to initiate polymerization. The polymerization rate was controlled by adding triamine at any desired time. At a BA conversion rate of 97% and an MEA conversion rate of 98%, 1050 ml (9.86 mol) of toluene, 7.15 g (72.2 mmol) of copper chloride, and 535 ml (5.00 mol) of MMA were added to the reaction solution. The polymerization rate was controlled by adding triamine at any desired time. At an MMA conversion rate of 89%, 1500 ml of toluene was added, and the reactor was cooled to terminate the reaction.

The reaction solution was diluted with 4.0 L of toluene, and then 20.6 g of p-toluenesulfonic acid monohydrate was added to the reaction solution, followed by stirring at room temperature for 3 hours. The solid was filtered off with a Kiriyama funnel, and then 14.4 g of Kyowaad 500SH (produced by Kyowa Chemical Industry Co., Ltd.) was added as an adsorbent to the resultant polymer solution, followed by further stirring at room temperature for 1 hour. Then, the adsorbent was filtered off with a Kiriyama funnel to produce a colorless transparent polymer solution. The resultant solution was dried to remove the solvent and the residual monomers, and thereby the target acrylic block copolymer 2A'6.5 was obtained.

GPC analysis of the resultant block copolymer 2A'6.5 showed a number-average molecular weight Mn of 71,416 and a molecular weight distribution Mw/Mn of 1.40.

PRODUCTION EXAMPLE 16

Synthesis of MMA-b-(BA-co-2EHA)-b-MMA (BA/ 2EHA=70/30% by Weight, (BA-co-2EHA)/ MMA=80/20% by Weight) Acrylic Block Copolymer (Referred to as "EBA8" Hereinafter)

The target acrylic block copolymer EBA8 was produced by the same method as in Production Example 1 except the following procedures: In a 5-L separable flask, 5.55 g (15.4 mmol) of diethyl 2,5-dibromoadipate, 695 ml (4.85 mol) of BA, and 305 ml (1.46 mol) of 2EHA were charged and subjected to polymerization. At a BA conversion rate of 95% and a 2EHA conversion rate of 95%, 299 ml (3.35 mol) of MMA was added to the reaction solution. At a MMA conversion rate of 70%, the reaction was terminated.

GPC analysis of the resultant acrylic block copolymer EBA8 showed a number-average molecular weight Mn of 109,184 and a molecular weight distribution Mw/Mn of 1.33.

PRODUCTION EXAMPLE 17

Synthesis of 50TBA7-B1

In a 500-L reactor purged with nitrogen and then evacuated, a solution previously prepared by mixing 6,272 g of acetonitrile and 8,940 g of BA was charged under reduced pressure. Next, 813.7 g of cuprous bromide was charged to the reactor, and the resultant mixture was heated to 68° C. and stirred for 30 minutes. Then, a mixed solution containing 57,216.0 g of BA and 1,305.4 g of butyl acetate, and a solution of 408.4 g of diethyl 2,5-dibromoadipate in 3,528.0 g of acetonitrile were added to the mixture, followed by stirring for 30 minutes under heating to 75° C. Then, 98.2 g of pentamethyldiethylenetriamine was added to the resultant mixture to initiate polymerization of butyl acrylate for a first block. The polymerization rate was controlled by adding triamine at any desired time. When the BA conversion rate reached 95%, 100,249.6 g of toluene, 561.5 g of cuprous chloride, 17,459.8 g of MMA, and 24,797.4 g of TBMA were added to the reaction solution, and then 98.2 g of pentamethyldiethylenetriamine was added to the mixture to initiate copolymerization of MMA/TBMA for a second block. When the MMA conversion rate reached 58%, the reaction solution was diluted with 77,940 g of toluene, and the reactor was cooled to terminate polymerization. GPC analysis of the resultant block copolymer showed a number-average molecular weight Mn of 104,800 and a molecular weight distribution Mw/Mn of 1.25. Then, toluene was added to the resultant block copolymer solution to control the polymer concentration to 25 wt %, and 728 g of p-toluenesulfonic acid was added to the solution, followed by stirring at room temperature for 3 hours in the reactor purged with nitrogen. A solution was sampled from the reaction solution and subjected to neutralization. After the solution was confirmed to be colorless and transparent, the reaction was terminated. Then, the solution was taken out from the reactor, and the solid was removed by solid-liquid separation. Then, 1,200 g of Kyowaad 500SH (produced by Kyowa Chemical Industry Co., Ltd.) was added to the resultant block copolymer solution, followed by stirring at room temperature for 1 hour in the reactor purged with nitrogen. A solution was sampled from the reaction solution. After the solution was confirmed to be neutral, the reaction was terminated. Then, the solution was taken out from the reactor, and the adsorbent was removed by solid-liquid separation. The polymer solution was supplied to a vented horizontal evaporator (produced by Kurimoto, Ltd., horizontal evaporator SCP-100) for evaporating the solvent and the unreacted monomers to isolate a polymer. The temperature of the body jacket and screw of the evaporator was adjusted to 180° C. using a heating medium, and the inside of the evaporator was kept at a reduced pressure of about 0.01 MPa or less using a vacuum pump. As a result, pellets of the title block copolymer were produced.

PRODUCTION EXAMPLE 18

Synthesis of 20T3A6.8-B1

In a 500-L reactor purged with nitrogen and then evacuated, a solution previously prepared by mixing 7,056 g of acetonitrile and 8,046 g of BA was charged under reduced pressure. Next, 851.5 g of cuprous bromide was charged to the reactor, and the resultant mixture was heated to 68° C. and stirred for 30 minutes. Then, a mixed solution containing 14,588.8 g of BA, 22,226.9 g of EA, 13,789.9 g of MEA, and 1,111.3 g of butyl acetate, and a solution of 427.4 g of diethyl 2,5-dibromoadipate in 2,822.4 g of acetonitrile were added to the mixture, followed by further stirring for 30 minutes under heating to 75° C. Then, 102.9 g of pentamethyldiethylenetriamine was added to the resultant mixture to initiate copolymerization of BA/EA/MEA for a first block. The polymerization rate was controlled by adding triamine at any desired time. When the BA conversion rate reached 95%, 96,202.9 g of toluene, 587.7 g of cuprous chloride, 30,513.5 g of MMA, and 10,834.2 g of TBMA were added to the reaction solution, and then 102.9 g of pentamethyldiethylenetriamine was added to the mixture to initiate copolymerization of MMA/TBMA for a second block. When the MMA conversion rate reached 59%, the reaction solution was diluted with 69,280 g of toluene, and the reactor was cooled to terminate polymerization. GPC analysis of the resultant block copolymer showed a number-average molecular weight Mn of 95,900 and a molecular weight distribution Mw/Mn of 1.36. Then, toluene was added to the resultant block copolymer solution to control the polymer concentration to 24 wt %, and 847 g of p-toluenesulfonic acid was added to the solution, followed by stirring at room temperature for 3 hours in the reactor purged with nitrogen. A solution was sampled from the reaction solution and subjected to neutralization. After the solution was confirmed to be colorless and transparent, the reaction was terminated. Then, the solution was taken out from the reactor, and the solid was removed by solid-liquid separation. Then, 940 g of Kyowaad 500SH (produced by Kyowa Chemical Industry Co., Ltd.) was added to the resultant block copolymer solution, followed by stirring at room temperature for 2 hours in the reactor purged with nitrogen. A solution was sampled from the reaction solution. After the solution was confirmed to be neutral, the reaction was terminated. Pellets of the title block copolymer were produced by the same method as in Production Example 17.

PRODUCTION EXAMPLE 19

Synthesis of 20T3A6.8-B2

In a 500-L reactor purged with nitrogen and then evacuated, a solution previously prepared by mixing 32,694.7 g of BA, 32,105.6 g of EA, 19,918.7 g of MEA, 2,430.4 g of acetonitrile, and 1,605.2.g of butyl acetate was charged under reduced pressure. Next, 615.0 g of cuprous bromide was charged to the reactor, and the resultant mixture was stirred for 15 minutes. Then, a solution of 617.4 g of diethyl 2,5-dibromoadipate in 4,704.0 g of acetonitrile was added to the mixture, followed by further stirring for 50 minutes under heating to 75° C. Then, 74.3 g of pentamethyldiethylenetriamine was added to the resultant mixture to initiate copolymerization of BA/EA/MEA for a first block. The polymerization rate was controlled by adding triamine at any desired time. When the BA conversion rate reached 96%, 73,751.1 g of toluene, 424.4 g of cuprous chloride, 29,530.3 g of MMA, and 10,485.1 g of TBMA were added to the reaction solution, and then 74.3 g of pentamethyldiethylenetriamine was added to the mixture to initiate copolymerization of MMA/TBMA for a second block. The polymerization rate was controlled by adding triamine at any desired time. When the MMA conversion rate reached 91%, the reaction solution was diluted with 220,000 g of toluene, and the reactor was cooled to terminate polymerization. GPC analysis of the resultant block copolymer showed a number-average molecular weight Mn of 110,200 and a molecular weight distribution Mw/Mn of 1.27. Then, toluene was added to the resultant block copolymer solution to control the polymer concentration to 25 wt %, and 1,468 g of p-toluenesulfonic acid was added to the solution, followed by stirring at room temperature for 3 hours in the reactor purged with nitrogen. A solution was sampled from the reaction solution and subjected to neutralization. After the solution was confirmed to be colorless and transparent, the reaction was terminated. Then, the solution was taken out from the reactor, and the solid was removed by solid-liquid separation. Then, 1,680 g of Kyowaad 500SH (produced by Kyowa Chemical Industry Co., Ltd.) was added to the resultant block copolymer solution, followed by stirring at room temperature for 1 hour in the reactor purged with nitrogen. A solution was sampled from the reaction solution. After the solution was confirmed to be neutral, the reaction was terminated. Pellets of the title block copolymer were produced by the same method as in Production Example 17.

PRODUCTION EXAMPLE 20

Synthesis 20T3A6-B1

First, 371.8 g of diethyl 2,5-dibromoadipate, 17,604.8 g of BA, 17,287.6 g of EA, and 10,725.4 g of MEA were charged and subjected to polymerization. When the BA conversion rate reached 95%, 33,333.3 g of MMA and 11,835.4 g of TBMA were added to the reaction mixture. When the MMA conversion rate reached 58%, the reaction was terminated. Then, pellets of the title block copolymer were produced by the same method as in Production Example 18. GPC analysis of the resultant acrylic block copolymer showed a number-average molecular weight Mn of 103,400 and a molecular weight distribution Mw/Mn of 1.36.

PRODUCTION EXAMPLE 21

Synthesis of 50T3A6.5-B1

First, 483.0 g of diethyl 2,5-dibromoadipate, 24,431.2 g of BA, 23,991.0 g of EA, and 14,884.3 g of MEA were charged and subjected to polymerization. When the BA conversion rate reached 95%, 21,046.7 g of MMA and 29,891.6 g of TBMA were added to the reaction mixture. When the MMA conversion rate reached 58%, the reaction was terminated. Then, pellets of the title block copolymer were produced by the same method as in Production Example 18.

GPC analysis of the resultant acrylic block copolymer showed a number-average molecular weight Mn of 98,900 and a molecular weight distribution Mw/Mn of 1.28.

PRODUCTION EXAMPLE 22

Synthesis of 50T3A6-B1

First, 424.9 g of diethyl 2,5-dibromoadipate, 20,119.8 g of BA, 19,757.3 g of EA, and 12,257.7 g of MEA were charged and subjected to polymerization. When the BA conversion rate reached 94%, 21,516.7 g of MMA and 30,559.2 g of TBMA were added to the reaction mixture. When the MMA conversion rate reached 56%, the reaction was terminated. Then, pellets of the title block copolymer were produced by the same method as in Production Example 18. GPC analysis of the resultant acrylic block copolymer showed a number-average molecular weight Mn of 101,200 and a molecular weight distribution Mw/Mn of 1.28.

PRODUCTION EXAMPLE 23

Synthesis of 40T2A'6.5-B1

First, 421.7 g of diethyl 2,5-dibromoadipate, 37,031.5 g of BA, and 18,800.7 g of MEA were charged for polymerization. When a BA conversion rate reached 95%, 23,103.6 g of MMA and 21,875.3 g of TBMA were added to the reaction mixture. When an MMA conversion rate reached 61%, the reaction was terminated. Then, pellets of the title block copolymer were produced by the same method as in Production Example 19.

GPC analysis of the resultant acrylic block copolymer showed a number-average molecular weight Mn of 93,700 and a molecular weight distribution Mw/Mn of 1.36.

PRODUCTION EXAMPLE 24

Synthesis 50TEBA8-B1

First, 377.1 g of diethyl 2,5-dibromoadipate, 42,289.3 g of BA, and 18,337.1 g of 2EHA were charged and subjected to polymerization. When the BA conversion rate reached 95%, 7,865.0 g of MMA and 11,170.3 g of TBMA were added to the reaction mixture. When the MMA conversion rate reached 71%, the reaction was terminated. Then, pellets of the title block copolymer were produced by the same method as in Production Example 18.

GPC analysis of the resultant acrylic block copolymer showed a number-average molecular weight Mn of 91,800 and a molecular weight distribution Mw/Mn of 1.29.

PRODUCTION EXAMPLE 25

Synthesis of BA7-B1

In a 500-L synthetic reactor, 339.0 g of diethyl 2,5-dibromoadipate and 48,276.0 g of BA were charged and subjected to polymerization. When the BA conversion rate reached 96%, 31,094.8 g of MMA was added to the reaction mixture. When the MMA conversion rate reached 60%, the reaction was terminated. Then, pellets of the title block copolymer were produced by the same method as in Production Example 17.

GPC analysis of the resultant acrylic block copolymer showed a number-average molecular weight Mn of 105,300 and a molecular weight distribution Mw/Mn of 1.38.

PRODUCTION EXAMPLE 26

Synthesis of 3A6-B1

First, 360.4 g of diethyl 2,5-dibromoadipate, 16,167.7 g of BA, 15,876.4 g of EA, and 9,849.9 g of MEA were charged and subjected to polymerization. When the BA conversion rate reached 96%, 41,887.0 g of MMA was added to the reaction mixture. When the MMA conversion rate reached 61%, the reaction was terminated. Then, pellets of the title block copolymer were produced by the same method as in Production Example 18.

GPC analysis of the resultant acrylic block copolymer showed a number-average molecular weight Mn of 104,200 and a molecular weight distribution Mw/Mn of 1.36.

PRODUCTION EXAMPLE 27

Synthesis of 2A'6.5-B1

First, 611.5 g of diethyl 2,5-dibromoadipate, 53,720.6 g of BA, and 27,232.8 g of MEA were charged for polymerization. When the BA conversion rate reached 96%, 43,528.4 g of MMA was added to the reaction mixture. When the MMA conversion rate reached 92%, the reaction was terminated. Then, pellets of the title block copolymer were produced by the same method as in Production Example 19. GPC analysis of the resultant acrylic block copolymer showed a number-average molecular weight Mn of 108,300 and a molecular weight distribution Mw/Mn of 1.33.

PRODUCTION EXAMPLE 28

Synthesis of MMA-b-(BA-co-TBA)-b-MMA (BA/TBA=97.5/2.5 mol %, (BA-co-TBA)/MMA=70/30% by Weight) Acrylic Block Copolymer (Referred to as "2.5STBA7" Hereinafter)

The target acrylic block copolymer 2.5STBA7 was produced by the same method as in Production Example 1 except the following procedures: In a 5-L separable flask, 5.65 g (15.7 mmol) of diethyl 2,5-dibromoadipate, 877 ml (6.12 mol) of BA, and 22.9 ml (0.16 mol) of TBA were charged and subjected to polymerization. When the BA conversion rate reached 95% and the TBA conversion rate reached 95%, 369 ml (3.45 mol) of MMA was added to the reaction mixture. When the MMA conversion rate reached 65%, the reaction was terminated.

GPC analysis of the resultant acrylic block copolymer 2.5STBA7 showed a number-average molecular weight Mn of 116,000 and a molecular weight distribution Mw/Mn of 1.52.

PRODUCTION EXAMPLE 29

Synthesis of MMA-b-(BA-co-TBA)-b-MMA (BA/TBA=90/10 mol %, (BA-co-TBA)/MMA=70/30% by Weight) Acrylic Block Copolymer (Referred to as "10STBA7" Hereinafter)

The target acrylic block copolymer 10STBA7 was produced by the same method as in Production Example 1 except the following procedures: In a 5-L separable flask, 5.64 g (15.7 mmol) of diethyl 2,5-dibromoadipate, 808 ml (5.64 mol) of BA, and 91.6 ml (0.63 mol) of TBA were charged and subjected to polymerization. When the BA conversion rate reached 95% and the TBA conversion rate reached 96%, 461 ml (4.31 mol) of MMA was added to the reaction mixture. When the MMA conversion rate reached 79%, the reaction was terminated.

GPC analysis of the resultant acrylic block copolymer 10STBA7 showed a number-average molecular weight Mn of 113,408 and a molecular weight distribution Mw/Mn of 1.35.

EXAMPLE 1

Reaction of Conversion to Acid Anhydride Group in Acrylic Block Copolymer 50TBA7 and Characteristic Evaluation First, 45 g of the acrylic block copolymer 50TBA7 produced in Production Example 1 and 0.09 g of Irganox 1010 (produced by Ciba Specialty Chemicals Inc.) were melt-kneaded at 100 rpm for 20 minutes with Labo Plastomill 50C150 (blade shape: roller shape R60, produced by Toyo Seiki Co., Ltd.) set to 240° C. to produce the target acid anhydride group-containing acrylic block copolymer (referred to as "50ANBA7" hereinafter).

Conversion to an acid anhydride group and a carboxyl group of a tert-butyl ester site could be confirmed by IR (infrared absorption spectrum) and $^{13}C(^{1}H)$-NMR (nuclear magnetic resonance spectrum). Namely, in IR, an absorption spectrum derived from the acid anhydride group was observed at about 1800 cm$^{-1}$ after conversion. In $^{13}$C($^{1}$H)-NMR, signals at 82 ppm and 28 ppm derived from the quaternary carbon of a tert-butyl group and carbon of a methyl group, respectively, disappeared after conversion, and signals at 172 to 173 ppm(m) and 176 to 179 ppm(m) derived from carbonyl carbon of the acid anhydride group and carbonyl carbon of the carboxyl group, respectively, newly appeared. The contents of a monomer containing the acid anhydride group and a monomer containing the carboxyl group were 24% by weight and 21% by weight, respectively, in the methacrylic polymer block of the resultant acrylic block copolymer. The contents were calculated from the integrated values of the above-described signals in $^{13}$C($^{1}$H)-NMR.

The resultant bulk sample was molded by heat pressing at 240° C. to produce a cylindrical molded product of 30 mm in diameter and 12 mm in thickness for evaluating compression set. The molded product was used for measuring hardness and compression set. Similarly, a molded sheet product having a thickness of 2 mm was produced by heat pressing. The molded sheet product was used for measuring oil resistance, mechanical strength, and heat resistance. Furthermore, the sheet molded product was again milled and kneaded by Labo Plastomill for evaluating the recycling property.

Thermogravimetric analysis of the acid anhydride group-containing acrylic block copolymer 50ANBA7 showed a 5% weight loss temperature of 357° C.

EXAMPLES 2 to 12

Reaction of Conversion to Acid Anhydride Group and Characteristic Evaluation

The acrylic block copolymers (5TBA7, 20TBA7, 100TBA7, 5T3A7, 20T3A7, 20T3A6, 50T3A6, 100T3A6, 100T2A6, 40T2A'6.5, and 50TEBA8) produced in Production Examples 2 to 11 and 12 were used for producing acid anhydride group-containing acrylic block copolymers (the resultant acrylic block copolymers are referred to as "5ANBA7", "20ANBA7 ", "100ANBA7", "5AN3A7", "20AN3A7", "20AN3A6", "50AN3A6", "100AN3A6", "100AN2A6", "40AN2A'6.5", and "50ANEBA8", respectively, hereinafter) according to the same procedures as in Example 1.

As in Example 1, the contents of a monomer containing the acid anhydride group and a monomer containing the carboxyl group were calculated by $^{13}$C($^{1}$H)-NMR analysis.

The contents of the monomer containing the acid anhydride group and the monomer containing the carboxyl group in the methacrylic polymer block of the resultant acrylic block copolymers are described below in that order.

The contents in the methacrylic polymer block of 5ANBA7 were respectively 2% by weight and 4% by weight.

The contents in the methacrylic polymer block of 20ANBA7 were respectively 11% by weight and 19% by weight.

The contents in the methacrylic polymer block of 100ANBA7 were respectively 69% by weight and 31% by weight.

The contents in the methacrylic polymer block of 5AN3A7 were respectively 2% by weight and 7% by weight.

The contents in the methacrylic polymer block of 20AN3A6 were respectively 3% by weight and 17% by weight.

The contents in the methacrylic polymer block of 50AN3A6 were respectively 22% by weight and 18% by weight.

The contents in the methacrylic polymer block of 100AN3A6 were respectively 45% by weight and 55% by weight.

The contents in the methacrylic polymer block of 40AN2A'6.5 were respectively 20% by weight and 20% by weight.

The contents in the methacrylic polymer block of 50ANEBA8 were respectively 26% by weight and 27% by weight.

Also, cylindrical molded products of 30 mm in diameter and 12 mm in thickness for evaluating compression set were formed by the same procedures as in Example 1. These molded products were used for measuring hardness and compression set. Similarly, molded sheet products of 2 mm in thickness were formed by heat pressing. These sheet products were used for measuring oil resistance, mechanical strength, and heat resistance. The molded sheet products were again milled and kneaded by Plastomill for evaluating the recycling property.

EXAMPLE 13

Hydrolytic Carboxylation of Acid Anhydride Group-containing Acrylic Block Copolymer and Characteristic Evaluation First, 20 g of 20AN3A6 and 40 g of water were placed in a pressure-resistant vessel, and the resultant mixture was heated at 200° C. for 2 hours to produce the target carboxyl-containing acrylic block copolymer (referred to as "20C3A6" hereinafter).

Conversion of the acid anhydride group to the carboxyl group could be confirmed by IR (infrared absorption spectrum) and $^{13}$C($^{1}$H)-NMR analysis (nuclear magnetic resonance spectrum).

Namely, in IR analysis, an absorption spectrum at about 1800 cm$^{-1}$ derived from the acid anhydride group disappeared after conversion. In $^{13}$C($^{1}$H)-NMR analysis, a signal at 172 to 173 ppm(m) derived from carbonyl carbon of the acid anhydride group was quantitatively converted to a signal at 176 to 179 ppm(m) derived from carbonyl carbon of the carboxyl group.

The heat resistance of the resultant carboxyl-containing acrylic block copolymer was measured by a Kokashiki flow meter. Also, 100 parts by weight of the resultant carboxyl-containing acrylic block copolymer was mixed with 0.2 parts by weight of Irganox 1010 (Ciba Specialty Chemicals Inc.), and the resultant mixture was melt-kneaded at 50 rpm for 20 minutes with Labo Plastomill (produced by Toyo Seiki Co., Ltd.) set at 240° C. to produce a bulk sample. The resulting sample was heat-pressed at 240° C. to obtain a molded product of 2 mm in thickness for evaluating physical properties.

EXAMPLE 14

A target carboxyl-containing acrylic block copolymer (referred to as "50C3A6" hereinafter) was produced by the same method as in Example 13 except that 50AN3A6 was used. Also, samples for evaluating properties were formed by the same method as in Example 13.

EXAMPLE 15

A target carboxyl-containing acrylic block copolymer (referred to as "100C3A6" hereinafter) was produced by the same method as in Example 13 except that 100AN3A6 was used. Also, samples for evaluating properties were formed by the same method as in Example 13.

COMPARATIVE EXAMPLES 1 to 4

First, 100 parts by weight of the copolymer produced in each of Production Examples 13 to 16 was mixed with 0.2 parts by weight of Irganox 1010 (Ciba Specialty Chemicals Inc.), and the resultant mixture was melt-kneaded at 50 rpm for 20 minutes with Labo Plastomill (produced by Toyo Seiki Co., Ltd.) set at 190° C. to produce a bulk sample.

The resulting samples were heat-pressed at 190° C. to obtain cylindrical molded products of 30 mm in diameter and 12 mm in thickness for evaluating compression set. These molded products were used for measuring hardness and compression set. Similarly, molded sheet products of 2 mm in thickness were formed by heat pressing. These sheet products were used for measuring oil resistance, mechanical strength, and heat resistance. The molded sheet products were again milled and kneaded by Plastomill for evaluating the recycling property.

As a result of thermogravimetric analysis of the acrylic block copolymer BA7 not containing an acid anhydride group and produced in Comparative Example 1, the 5% weight loss temperature was 280° C. This indicates that thermal decomposition resistance is significantly improved by introducing an acid anhydride group.

COMPARATIVE EXAMPLE 5

Santoprene 211-55 (AES Japan Co., Ltd.), which was an olefinic elastomer, was melt-kneaded with Labo Plastomill (produced by Toyo Seiki Co., Ltd.) set at 170° C. at a screw rotational speed of 100 rpm to obtain a sample.

The resulting sample was heat-pressed at 170° C. to obtain a cylindrical molded product of 30 mm in diameter and 12 mm in thickness. The molded product was used for measuring hardness and compression set. Similarly, a molded sheet product of 2 mm in thickness was formed by heat pressing at 170° C. The sheet product was used for measuring oil resistance, mechanical strength, and heat resistance. As a result, it was found that with the olefinic elastomer, the compression set was good, but the oil resistance was at an insufficient level.

COMPARATIVE EXAMPLE 6

Pelprene P-30B (Toyobo Co., Ltd.), which was an ester elastomer, was melt-kneaded with Labo Plastomill (produced by Toyo Seiki Co., Ltd.) set at 190° C. at a screw rotational speed of 50 rpm to obtain a sample.

The resulting sample was heat-pressed at 190° C. to obtain a cylindrical molded product of 30 mm in diameter and 12 mm in thickness. The molded product was used for measuring hardness and compression set. Similarly, a molded sheet product of 2 mm in thickness was formed by heat pressing at 190° C. The sheet product was used for measuring oil resistance, mechanical strength, and heat resistance. As a result, it was found that with the polyester elastomer, the mechanical properties were good, but flexibility was insufficient even with a low-hardness grade, and the oil resistance and compression set were also insufficient.

COMPARATIVE EXAMPLE 7

Disks of 30 mm in diameter were cut out of a cross-linked chloroprene (CR) molded sheet product of 2 mm in thickness, and six disks were stacked to obtain a molded product for evaluating compression set. The molded product was used for measuring hardness and compression set. Also, a dumbbell was cut out of a molded sheet product and used for evaluating oil resistance and tensile properties. Furthermore, the molded sheet product was again milled and kneaded by Plastomill for evaluating the recycling property. As a result, it was found that with cross-linked chloroprene, the mechanical properties, oil resistance, and compression set were good, but the sample could not be recycled.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polymer | 50ANB A7 | 5ANB A7 | 20ANB A7 | 100ANB A7 | 5AN3 A7 | 20AN3 A7 | 20AN3 A6 | 50AN3 A6 | 100AN3 A6 | 100AN2 A6 | 40AN2 A'6.5 | 50ANEB A8 |
| Hardness JIS-A | 20 | 12 | 14 | 21 | 37 | 36 | 45 | 57 | 23 | 29 | 34 | 4 |
| Strength at break (MPa) | 6.5 | 4.6 | 6.4 | 1.7 | 4.8 | 6.9 | 11.2 | 8.7 | 5.5 | 5 | 7 | 3.1 |
| Elongation at break (%) | 369 | 328 | 354 | 260 | 507 | 531 | 295 | 320 | 372 | 255 | 280 | 412 |
| Heat resistance (° C.) | 126 | 121.8 | 130 | 137 | 113 | 125 | 152 | 157.4 | 148 | 154 | 155 | 124 |
| Oil resistance | | | | | | | | | | | | |
| Rate of weight change (wt %) | 57.3 | 111.3 | 142.8 | 46.8 | 22.5 | 19.9 | 17.6 | 18.4 | 20.6 | 18.8 | 33 | 175.9 |
| Shape after immersion | ○~Δ | Δ | Δ | ○~Δ | ○ | ○ | ○ | ○ | ○ | ○ | ○ | x |
| Compression set (%) | | | | | | | | | | | | |
| 70° C., 22 H | 42 | 40.8 | 32 | 26 | 68.6 | 51 | — | — | — | — | — | 35 |
| 100° C., 22 H | 58 | — | 49 | 52 | — | — | 57 | 53 | 39.5 | — | 35 | 53 |
| 120° C., 22 H | — | — | — | — | — | — | — | — | — | 44.3 | — | — |
| 5% weight loss temp. (° C.) | 357 | 321 | — | — | 331 | — | — | 354 | 355 | 356 | — | — |
| Recycling property | ○ | ○ | ○ | ○ | ○ | ○ | ○ | ○ | ○ | ○ | — | ○ |

TABLE 2

|  | Example | | |
|---|---|---|---|
|  | 13 | 14 | 15 |
| Polymer | 20C3A6 | 50C3A6 | 100C3A6 |
| Hardness JIS-A | 47 | 51 | 21 |
| Strength at break (MPa) | 11.7 | 10.1 | 4.8 |
| Elongation at break (%) | 332 | 248 | 342 |
| Heat resistance (° C.) | 173.1 | 192.1 | 190.1 |
| Oil resistance (wt %) | 13.6 | 18.5 | 21.7 |
| Compression set (%) 100° C., 22 H | 49.5 | 55.6 | 42.5 |
| Recycling property | ○ | ○ | ○ |

TABLE 3

|  | Comparative Example | | | | | | |
|---|---|---|---|---|---|---|---|
|  | 1 | 2 | 3 | 4 | 5 | 6 | 7 |
| Polymer | BA7 | 3A7 | 2A'6.5 | EBA8 | 211-55 | P-30B | CR |
| Hardness JIS-A | 22 | 38 | 55 | 2 | 53 | 79 | 63 |
| Strength at break (MPa) | 8.6 | 6.6 | 8.4 | 3.4 | 4.5 | 25 | 17 |
| Elongation at break (%) | 339 | 621 | 338 | 542 | 438 | 1426 | 350 |
| Heat resistance (° C.) | 119 | 111 | — | 95 | 154.3 | 144.5 | — |
| Oil resistance |  |  |  |  |  |  |  |
| Rate of weight change (wt %) | 54.9 | 21 | 36.1 | — | 189.5 | 64 | 30 |
| Shape after immersion | x | ○ | ○~Δ | — | x | Δ | ○ |
| Compression set (%) |  |  |  |  |  |  |  |
| 70° C., 22 H | 49 | 76 | — | 83 | 28.7 | 65 | — |
| 100° C., 22 H | 70 | 100 | 98 | 100 | — | — | — |
| 120° C., 22 H | — | — | — | — | — | — | 33 |
| 5% weight loss temp. (° C.) | 280 | 287 | — | — | — | — | — |
| Recycling property | ○ | ○ | ○ | ○ | ○ | ○ | X |

Table 1 shows the test results of Examples 1 to 12, Table 2 shows the test results of Examples 13 to 15, and Table 3 shows the test results of Comparative Examples 1 to 7.

These results indicate that the acid anhydride group-containing block copolymer is excellent in compression set at a high temperature, and has improved heat resistance and thermal decomposition resistance, as compared with the block copolymer not containing the acid anhydride group (Examples 1 to 12). It is also found that strength required for molding or the like is maintained. It is further found that materials having various degrees of hardness from low hardness to high hardness while maintaining flexibility can be produced by controlling the composition of the acrylic polymer block in the acid anhydride group-containing acrylic block copolymer, the composition ratio between the acrylic polymer block and the methacrylic polymer block, and the content of the acid anhydride group.

It is further found that the acid anhydride group-containing block copolymer comprising the acrylic polymer block composed of BA is a material excellent in flexibility and balance between heat resistance, mechanical properties, and low-temperature properties.

It is further found that the acid anhydride group-containing block copolymer comprising the acrylic polymer block composed of BA, EA, and MEA is a material very excellent in oil resistance and excellent in balance between heat resistance and mechanical properties.

It is further found that the acid anhydride group-containing block copolymer comprising the acrylic polymer block composed of BA and MEA is a material excellent balance between oil resistance, heat resistance, and mechanical properties.

It is further found that the acid anhydride group-containing block copolymer comprising the acrylic polymer block composed of BA and 2EHA is a material having flexibility and very low hardness, and excellent balance between heat resistance, mechanical properties, and low-temperature properties.

It is further found that the block copolymer containing a carboxyl group produced by hydrolytic ring opening of the acid anhydride group has excellent compression set at high temperatures and improved heat resistance (Examples 13 to 15). It is further found that strength required for molding is maintained. In addition, it is found that the cohesive force is improved by introducing the carboxyl group, but such a block copolymer is a material exhibiting low hardness and excellent compression set and mechanical strength while maintaining hardness.

On the other hand, it is found that the samples of Comparative Examples 1 to 4 have the recycling property, but the compression set, heat resistance, and thermal decomposition resistance are insufficient. It is also found that the sample of Comparative Example 5 has the recycling property and excellent compression set, but the oil resistance is insufficient. It is further found that the sample of Comparative Example 6 has the recycling property and excellent tensile properties, but the oil resistance and compression set are insufficient, and flexibility is also insufficient. It is further found that the sample of Comparative Example 7 has excellent tensile properties and compression set, but recycling is impossible because it comprises cross-linked rubber.

Tables 1 to 3 indicate that the thermoplastic elastomer compositions of the present invention have the recycling property and excellent compression set, oil resistance, and heat resistance, and maintains strength required for molding or the like. It is also found that the cohesive force is improved by introducing a functional group, but the compositions are materials exhibiting low hardness, flexibility, and excellent compression set and mechanical strength.

EXAMPLE 16

Reaction of Conversion to Acid Anhydride Group in 20T3A6

First, 100 parts by weight of the polymer 20T3A6 produced in Production Example 7 was mixed with 0.2 parts by weight of Irganox 1010 (Ciba Specialty Chemicals Inc.), and the resultant mixture was kneaded and extruded with a vented twin screw extruder (44 mm, L/D =42.25) (produced by Japan Steel Works, Ltd.) at a rotational speed of 50 rpm and at 240° C. to produce a target acid anhydride group-containing acrylic block copolymer 20AN3A6. As in Example 1, conversion to an acid anhydride group of a tert-butyl ester site could be confirmed by IR (infrared absorption spectrum) and $^{13}C(^1H)$-NMR (nuclear magnetic resonance spectrum). It was thus confirmed that an acid anhydride group-containing acrylic block copolymer can be produced by any of various processing machines, and that such a block copolymer can be produced by an extruder to simplify the production process.

EXAMPLE 17

Reaction of Conversion to Acid Anhydride Group and Characteristic Evaluation First, 100 parts by weight of the polymer 50TBA7-B1 produced in Production Example 17 was mixed with 0.3 parts by weight of Irganox 1010 (Ciba Specialty Chemicals Inc.), and the resultant mixture was kneaded and extruded with a vented twin screw extruder (44 mm, L/D =42.25) (produced by Japan Steel Works, Ltd.) at a rotational speed of 300 rpm and at 240° C. to produce a target acid anhydride group-containing acrylic block copolymer 50ANBA7-B1. In this example, an underwater cut pelletizer (produced by GALA INDUSTRIES INC. CLS-6-8.1 COMPACT LAB SYSTEM) was connected to the front end of the twin screw extruder, and Alflow H-50ES (produced by NOF Corporation) was added as an anti-sticking agent to circulating water in the underwater cut pelletizer, for producing anti-sticking spherical pellets.

As in Example 1, conversion to an acid anhydride group of a tert-butyl ester site could be confirmed by IR (infrared absorption spectrum) and $^{13}C(^1H)$-NMR (nuclear magnetic resonance spectrum). Also, the resulting pellets were melt-kneaded at 100 rpm for 10 minutes with Labo Plastomill (produced by Toyo Seiki Co., Ltd.) set at 220° C., and then heat-pressed at 220° C. to obtain a cylindrical molded product of 30 mm in diameter and 12 mm in thickness for evaluating compression set. The molded product was used for measuring hardness and compression set. Similarly, a molded sheet product of 2 mm in thickness was formed by heat pressing. The sheet product was used for measuring oil resistance, mechanical strength, and heat resistance. Also, the molded sheet product was again milled and kneaded by Plastomill to evaluate the recycling property.

EXAMPLES 18 to 24

Reaction of Conversion to Acid Anhydride Group and Characteristic Evaluation The acrylic block copolymers (20T3A6.8-B1, 20T3A6.8-B2, 20T3A6-B1, 50T3A6.5-B1, 50T3A6-B1, 40T2A'6.5-B1, and 50TEBA8-B1) produced in Production Examples 18 to 24 were used for producing acid anhydride group-containing acrylic block copolymers (referred to as "20AN3A6.8-B1", "20AN3A6.8-B2", "20AN3A6-B1", "50AN3A6.5-B1", "50AN3A6-B1", "40AN'2A6.5-B1", and "50ANEBA8-B1" respectively, hereinafter) by the same procedures as in Example 17.

Cylindrical molded products of 30 mm in diameter and 12 mm in thickness for evaluating compression set were formed by the same procedures as in Example 17. These molded products were used for measuring hardness and compression set. Similarly, molded sheet products of 2 mm in thickness were formed by heat pressing. These sheet products were used for measuring oil resistance, mechanical strength, and heat resistance. Also, the molded sheet products were again milled and kneaded by Plastomill to evaluate the recycling property.

COMPARATIVE EXAMPLES 8 to 10

First, 100 parts by weight of each of the polymers BA7-B1, 3A6-B1, and 2A'6.5-B1 produced in Production Examples 25 to 27, respectively, was mixed with 0.3 parts by weight of Irganox 1010 (Ciba Specialty Chemicals Inc.), and the resultant mixture was kneaded and extruded with a vented twin screw extruder (44 mm, L/D =42.25) (produced by Japan Steel Works, Ltd.) at a rotational speed of 300 rpm and at 190° C. In this example, an underwater cut pelletizer (produced by GALA INDUSTRIES INC. CLS-6-8.1 COMPACT LAB SYSTEM) was connected to the front end of the twin screw extruder, and Alflow H-50ES (produced by NOF Corporation) was added as an anti-sticking agent to circulating water in the underwater cut pelletizer, for producing anti-sticking spherical pellets.

The resulting pellets were melt-kneaded at 50 rpm for 10 minutes with Labo Plastomill (produced by Toyo Seiki Co., Ltd.) set at 190° C. to obtain bulk samples.

Each of the samples was heat-pressed at 190° C. to obtain a cylindrical molded product of 30 mm in diameter and 12 mm in thickness for evaluating compression set. The molded products were used for measuring hardness and compression set. Similarly, molded sheet products of 2 mm in thickness were formed by heat pressing. The sheet products were used for measuring oil resistance, mechanical strength, and heat resistance. Also, the molded sheet products were again milled and kneaded by Plastomill to evaluate the recycling property.

TABLE 4

|  | Example | | | | | | | | Comparative Example | | |
| --- | --- | --- | --- | --- | --- | --- | --- | --- | --- | --- | --- |
|  | 17 | 18 | 19 | 20 | 21 | 22 | 23 | 24 | 8 | 9 | 10 |
| Polymer | 50ANBA7-B1 | 20AN3A6.8-B1 | 20AN3A6.8-B2 | 20AN3A6-B1 | 50AN3A6.5-B1 | 50AN3A6-B1 | 40AN2A'6.5-B1 | 50ANEBA8-B1 | BA7-B1 | 3A6-B1 | 2A'6.5-B1 |
| Hardness JIS-A | 15 | 46 | 45 | 67 | 44 | 53 | 34 | 7 | 21 | 84 | 52 |
| Strength at break (MPa) | 4.6 | 10.6 | 11.4 | 14 | 13.7 | 14.4 | 8.2 | 3.3 | 6.9 | 12.3 | 9.4 |

TABLE 4-continued

|  | Example | | | | | | | | Comparative Example | | |
|---|---|---|---|---|---|---|---|---|---|---|---|
|  | 17 | 18 | 19 | 20 | 21 | 22 | 23 | 24 | 8 | 9 | 10 |
| Elongation at break (%) | 293 | 373 | 437 | 257 | 323 | 265 | 287 | 396 | 312 | 297 | 358 |
| Heat resistance (° C.) | — | 149 | 154 | 165 | 173 | 176 | 163 | — | 132 | 132 | 120 |
| Oil resistance (wt %) | 133 | 17 | 16.4 | 17 | 16 | 14.5 | 26.1 | 173 | 83 | 18.7 | 34.7 |
| Compression set (%) 100° C., 22 H | 32 | 68 | 84 | 88.7 | 50.1 | 54.1 | 50 | 75 | 85 | 100 | 94 |
| Recycling property | ○ | ○ | ○ | ○ | ○ | ○ | ○ | ○ | ○ | ○ | ○ |

Table 4 shows the test results of Examples 17 to 24 and Comparative Examples 8 to 10.

These results indicate that pelletization and reaction of conversion to an acid anhydride group can be performed with an extruder, and the acid anhydride group-containing block copolymer produced by the extruder exhibits excellent compression set at high temperatures and improved heat resistance and compression set characteristics, as compared with the block copolymer not containing the acid anhydride group. It is also found that strength required for molding or the like is maintained. It is further found that materials having various degrees of hardness from low hardness to high hardness while maintaining flexibility can be produced by controlling the composition of the acrylic polymer block in the acid anhydride group-containing acrylic block copolymer, the composition ratio between the acrylic polymer block and the methacrylic polymer block, and the content of the acid anhydride group.

Table 4 indicates that the thermoplastic elastomer compositions of the present invention have the recycling property and excellent compression set characteristics, oil resistance and heat resistance, and maintains strength required for molding. It is also found that cohesive force is improved by introducing a functional group, but the compositions are materials exhibiting low hardness, flexibility, and excellent compression set and mechanical strength.

EXAMPLE 25

Hydrolytic Carboxylation of Acid Anhydride Group-containing Block Copolymer

First, 100 parts by weight of 20AN3A6 was mixed with 0.2 parts by weight of Irganox 1010 (Ciba Specialty Chemicals Inc.), and the resultant mixture was extruded and kneaded by a visible extruder (30 mm, L/D=36) (produced by Research Laboratory of Plastics Technology Co., Ltd.) including two thermomixers (30 mm, L/D=12) (produced by Noritake Co., Limited) provided at the front end at a rotational speed of 25 rpm and 200° C. under the condition in which water was supplied at 0.14 kg/hr under pressure, to obtain a target carboxyl-containing block copolymer (20C3A6).

Conversion of an acid anhydride group to a carboxyl group could be confirmed by IR (infrared absorption spectrum) and $^{13}C(^1H)$-NMR (nuclear magnetic resonance spectrum).

Namely, in IR analysis, an absorption spectrum at about 1800 cm$^{-1}$ derived from the acid anhydride disappeared after conversion. In $^{13}C(^1H)$-NMR, a signal at 172 to 173 ppm(m) derived from carbonyl carbon of the acid anhydride group was quantitatively converted to a signal at 176 to 179 ppm(m) derived from carbonyl carbon of the carboxyl group.

It was thus confirmed that a carboxyl-containing acrylic block copolymer can be produced by ring-opening reaction of an acid anhydride group using any of various processing machines. It is also found that such a copolymer can be produced by an extruder, thereby simplifying the production process.

<Thermoplastic Resin Composition>

EXAMPLE 26

Reaction of Conversion to Acid Anhydride Group in Acrylic Block Copolymer 2.5STBA7

First, 45 g of the acrylic block copolymer 2.5STBA7 produced in Production Example 28 was mixed with 0.09 g of Irganox 1010 (Ciba Specialty Chemicals Inc.), and the resultant mixture was melt-kneaded for 20 minutes with Labo Plastomill (produced by Toyo Seiki Co., Ltd.) set at 240° C. at 100 rpm to obtain a target acid anhydride group-containing acrylic block copolymer (referred to as "2.5SANBA7" hereinafter).

Conversion to an acid anhydride group and a carboxyl group of a tert-butyl ester site could be confirmed by IR (infrared absorption spectrum) and $^{13}C(^1H)$-NMR (nuclear magnetic resonance spectrum). Namely, in IR analysis, an absorption spectrum derived from the acid anhydride group could be observed at about 1800cm$^{-1}$ after conversion. The contents of a monomer containing the acid anhydride and a monomer containing the carboxyl group were 0.6% by weight and 1.9% by weight, respectively, in the acrylic polymer block of the resultant acrylic block copolymer.

The contents of the monomers containing the acid anhydride group and the carboxyl group, respectively, were calculated by a method in which the carboxyl group in the acrylic block copolymer was methylated with diazomethane, and then subjected to pyrolysis GC (using GC-9A produced by Shimadzu Corporation).

Then, 30 parts by weight of UBESTA 3012U (Ube Industries, Ltd.) was added to 100 parts by weight of the resultant 2.5SANBA7, and the resultant mixture was kneaded for 20 minutes with Labo Plastomill (produced by Toyo Seiki Co., Ltd.) set at 190° C. at a rotational speed of 100 rpm to obtain a bulk sample. The resultant bulk sample was heat-pressed at 190° C. to obtain a cylindrical molded product of 30 mm in diameter and 12 mm in thickness for evaluating compression set. The molded product was used for measuring hardness and compression set. Similarly, a molded sheet product of 2 mm in thickness was formed by heat pressing. The sheet product was used for measuring oil resistance and mechanical strength.

EXAMPLE 27

Reaction of Conversion to Acid Anhydride Group in Acrylic Block Copolymer 10STBA7

A target acid anhydride group-containing acrylic block copolymer (referred to as "10SANBA7" hereinafter) was produced by reaction of conversion to an acid anhydride group in the same manner as in Example 26 except that the acrylic block copolymer 10STBA7 produced in Production Example 29 was used. The copolymer was kneaded with UBESTA 3012U by the same method as in Example 26 to produce a sample for evaluation. The contents of a monomer containing the acid anhydride and a monomer containing the carboxyl group were 2% by weight and 7% by weight, respectively, in the acrylic polymer block of the resultant acrylic block copolymer. The contents were calculated from the integral value of the above-described signal in $^{13}C(^{1}H)$-NMR analysis.

Furthermore, the copolymer was kneaded with UBESTA 3012U by the same method as in Example 26 to produce a sample for evaluation.

COMPARATIVE EXAMPLE 11

First, 0.2 parts by weight of Irganox 1010 (Ciba Specialty Chemicals Inc.) and 30 parts by weight of UBESTA 3012U (Ube Industries, Ltd.) were added to 100 parts by weight of BA7 produced in Production Example 13, and the resultant mixture was kneaded for 20 minutes with Labo Plastomill (produced by Toyo Seiki Co., Ltd.) set at 190° C. at a rotational speed of 100 rpm to obtain a bulk sample. The resultant bulk sample was heat-pressed at 190° C. to obtain a cylindrical molded product of 30 mm in diameter and 12 mm in thickness for evaluating compression set. The molded product was used for measuring hardness and compression set. Similarly, a molded sheet product of 2 mm in thickness was formed by heat pressing. The sheet product was used for measuring oil resistance and mechanical strength.

TABLE 5

| | | | Example No. | | Comp. Example |
|---|---|---|---|---|---|
| | | | 26 | 27 | 11 |
| Composition | Block copolymer | 2.5SANBA7 | 100 | | |
| | | 10SANBA7 | | 100 | |
| | | BA-7 | | | 100 |
| | Thermoplastic resin 3012U | | 30 | 30 | 30 |
| Evaluation results | Hardness (JIS-A) | | 55 | 65 | 66 |
| | Tensile properties | Strength at break (MPa) | 9.0 | 9.0 | 3.8 |
| | | Elongation at break (%) | 180 | 217 | 185 |
| | Compression set 70° C., 22 Hr (%) | | 56 | 58 | 63 |
| | Oil resistance | Rate of weight change (wt %) | 64.3 | 63.0 | 112.8 |
| | | Shape after immersion | Δ | ○ | x |
| | Insoluble content (wt %) | | 28.3 | 38.5 | 23.3 |

Composition: parts

Table 5 shows the results of Examples 26 and 27 and Comparative Example 11. Table 5 indicates that the compositions containing the acrylic block copolymer comprising the acrylic polymer block having the acid anhydride group have flexibility and excellent mechanical strength, oil resistance, and compression set, as compared with the composition containing the acrylic block copolymer not having the acid anhydride group.

An increase in the acetone-insoluble content (%) shows reaction between polyamide resin and the acid anhydride group-containing block copolymer. Therefore, the acid anhydride group-containing acrylic block copolymer and a composition containing the acid anhydride group-containing acrylic block copolymer and a thermoplastic resin can be preferably used as compatibilizers.

EXAMPLE 28

First, 100 parts by weight of polybutylene terephthalate resin (DURANEX 2002 produced by Polyplastics Co., Ltd.) was added to 100 parts by weight of 20ANBA7, and the resultant mixture was kneaded for 20 minutes by Labo Plastomill (produced by Toyo Seiki Co., Ltd.) set at 240° C. at a rotational speed of 100 rpm to obtain a bulk sample. The resultant bulk sample was heat-pressed at 240° C. to obtain a molded product of 2 mm in thickness for evaluating physical properties. Test samples with predetermined shapes were punched from the molded product and used for evaluating the physical properties.

EXAMPLE 29

A molded product for evaluation was formed by the same method as in Example 28 except that 100 parts by weight of DAIAMID E47-S1 (Daicel Huls Ltd.) was added to 100 parts by weight of the acid anhydride group-containing acrylic block copolymer 20ANBA7, and the resultant mixture was kneaded for 20 minutes with Labo Plastomill (produced by Toyo Seiki Co., Ltd.) set at 190° C. at a rotational speed of 100 rpm, and then heat-pressed at 190° C.

EXAMPLE 30

A molded product for evaluation was formed by the same method as in Example 28 except that 100 parts by weight of UBESTA 3012U (Ube Industries, Ltd.) was added to 100 parts by weight of 20ANBA7.

COMPARATIVE EXAMPLE 12

First, polybutylene terephthalate resin (DURANEX 2002 produced by Polyplastics Co., Ltd.) was kneaded for 20 minutes with Labo Plastomill (produced by Toyo Seiki Co., Ltd.) set at 240° C. at a rotational speed of 100 rpm to obtain a bulk sample. The resultant bulk sample was heat-pressed at 240° C. to obtain a molded product of 2 mm in thickness for evaluating physical properties.

Test samples with predetermined shapes were punched from the molded product and used for evaluating the physical properties.

COMPARATIVE EXAMPLE 13

A molded product for evaluation was formed by the same method as in Comparative Example 12 except that Daiamid E47-S1 (Daicel Huls Ltd.) was used.

COMPARATIVE EXAMPLE 14

A molded product for evaluation was formed by the same method as in Comparative Example 12 except that UBESTA 3012U (Ube Industries, Ltd.) was used.

COMPARATIVE EXAMPLE 15

A molded product for evaluation was formed by the same method as in Comparative Example 12 except that 20ANBA7 was used.

TABLE 6

|  | Example | | | Comparative Example | | | |
| --- | --- | --- | --- | --- | --- | --- | --- |
|  | 28 | 29 | 30 | 12 | 13 | 14 | 15 |
| Polymer | 20ANBA7 | 20ANBA7 | 20ANBA7 | — | — | — | 20ANBA7 |
| Thermoplastic resin | 2002 | — | 3012U | 2002 | — | 3012U | — |
| Thermoplastic elastomer | — | E47-S1 | — | — | E47-S1 | — | — |
| Hardness JIS-A | 74 | 61 | 79 | — | — | — | 14 |
| Hardness JIS-D | — | — | — | 83 | 52 | 84 | — |
| Insoluble content (wt %) | — | 79.8 | 83.4 | 100 | 100 | 100 | 0 |

Table 6 shows the test results of Examples 28 to 30 and Comparative Examples 12 to 15. Table 6 indicates that according to the present invention, a molded product having desired flexibility can be obtained. In Examples 29 and 30, an increase in the acetone-insoluble content (wt %) shows reaction between the resin and the acid anhydride group-containing block copolymer. Therefore, the acid anhydride group-containing acrylic block copolymer and a composition containing the acid anhydride group-containing acrylic block copolymer and a thermoplastic resin can be preferably used as compatibilizers.

<Rubber Composition and Thermoplastic Elastomer Composition>

EXAMPLE 31

First, 10 parts by weight of cross-linked rubber 1 (silicone-acryl composite rubber, produced by Mitsubishi Rayon Co., Ltd., S-2001) was added to 100 parts by weight of the acid anhydride group-containing block copolymer 20AN3A6, and the resultant mixture was kneaded for 10 minutes by Labo Plastomill (produced by Toyo Seiki Co., Ltd.) set at 180° C. at a rotational speed of 100 rpm to obtain a bulk sample.

The resultant composition was molded into a cylindrical product of 30 mm in diameter and 12 mm in thickness, and the molded product was used for evaluating hardness and compression set. Also, the composition was heat-pressed at 180° C. to obtain a molded product of 2 mm in thickness for evaluating physical properties. The molded product was used for measuring oil resistance, tensile properties, and low-temperature brittleness.

EXAMPLES 32 and 33

In Example 32, 10 parts by weight of cross-linked rubber 2 (powdery NBR, produced by JSR Co., Ltd., PN20HA) was added to 100 parts by weight of the carboxyl-containing block copolymer (20C3A6). In Example 33, 10 parts by weight of cross-linked rubber 1 (silicone-acryl composite rubber, produced by Mitsubishi Rayon Co., Ltd., S-2001) was added to 100 parts by weight of the block copolymer (20C3A6). Each of the resultant mixtures was kneaded for 10 minutes with Labo Plastomill (produced by Toyo Seiki Co., Ltd.) set at 180° C. at a rotational speed of 100 rpm to obtain a bulk sample. Evaluation was performed by the same method as in Example 31.

EXAMPLE 34

A molded product for evaluation was formed by the same method as in Example 31 except that 57 parts by weight of cross-linked rubber 1 (silicone-acryl composite rubber, produced by Mitsubishi Rayon Co., Ltd., S-2001) was added to 100 parts by weight of the carboxyl-containing block copolymer 100C3A6, and the resultant mixture was kneaded for 10 minutes with Labo Plastomill (produced by Toyo Seiki Co., Ltd.) set at 230° C. at a rotational speed of 100 rpm, and heat-pressed at 230° C.

EXAMPLE 35

A molded product for evaluation was formed by the same method as in Example 31 except that 64.5 parts by weight of cross-linked rubber 1 (silicone-acryl composite rubber, produced by Mitsubishi Rayon° Co., Ltd., S-2001), 0.6 parts by weight of lubricant 1 (stearic acid, produced by Nacalai Tesque), and 1.6 parts by weight of an inorganic filler 1 (carbon black, produced by Asahi Carbon Co., Ltd., Asahi #15) were added to 100 parts by weight of the carboxyl-containing block copolymer 100C3A6. Then, the resultant mixture was kneaded for 10 minutes with Labo Plastomill (produced by Toyo Seiki Co., Ltd.) set at 230° C. at a rotational speed of 100 rpm, and heat-pressed at 230° C.

EXAMPLE 7B

The molded sheet product of 2 mm in thickness formed by heat-pressing in Example 7 was used for measuring low-temperature brittleness.

EXAMPLE 13B

First, 100 parts by weight of the carboxyl-containing block copolymer 20C3A6 was mixed with 0.2 parts by weight of Irganox 1010 (Ciba Specialty Chemicals Inc.), and the resultant mixture was melt-kneaded at 100 rpm for 20 minutes with Labo Plastomill (produced by Toyo Seiki Co., Ltd.) set at 180° C. to produce a bulk sample. The resulting sample was heat-pressed at 180° C. to obtain a cylindrical molded product of 30 mm in diameter and 12 mm in thickness for evaluating compression set. The molded product was used for measuring hardness and compression set. Similarly, the resultant composition was heat-pressed at 180° C. to obtain a molded sheet product of 2 mm in thickness for evaluating physical properties. The sheet product was used for measuring oil resistance, tensile properties, and low-temperature brittleness.

EXAMPLE 15B

First, 100 parts by weight of the carboxyl-containing block copolymer 100C3A6 was mixed with 0.2 parts by weight of Irganox 1010 (Ciba Specialty Chemicals Inc.), and the resultant mixture was melt-kneaded at 100 rpm for 20 minutes with Labo Plastomill (produced by Toyo Seiki Co., Ltd.) set at 230° C. to produce a bulk sample.

Evaluation was made by the same method as in Example 13B except that the resulting sample was heat-pressed at 230° C.

Plastomill (produced by Toyo Seiki Co., Ltd.) set at 180° C. at a rotational speed of 100 rpm to obtain a bulk sample.

The resultant composition was heat-pressed at 180° C. to obtain a cylindrical molded product of 30 mm in diameter and 12 mm in thickness. The molded product was used for evaluating hardness and compression set. Similarly, the composition was heat-pressed to obtain a molded sheet product of 2 mm in thickness. The molded sheet product was used for measuring oil resistance, tensile properties, and frictionality, and further measuring processability.

EXAMPLE 37

Molded products were formed by the same method as in Example 36 except that 20 parts by weight of a lubricant 1 (stearic acid, produced by Nacalai Tesque) and 1.25 parts by weight of an inorganic filler 1 (carbon black, produced by Asahi Carbon Co., Ltd., Asahi #15) were added to 100 parts by weight of the acid anhydride group-containing block copolymer 20AN3A6.

TABLE 7

| | | | \multicolumn{8}{c}{Example No.} | | | | | | | |
|---|---|---|---|---|---|---|---|---|---|---|
| | | | 31 | 32 | 33 | 34 | 35 | 7B | 13B | 15B |
| Composition(*) | Block copolymer | 20AN3A6 | 100 | | | | | 100 | | |
| | | 20C3A6 | | 100 | 100 | | | | 100 | |
| | | 100C3A6 | | | | 100 | 100 | | | 100 |
| | Cross-linked rubber | Cross-linked rubber 1 | 10 | | 10 | 57 | 64.5 | | | |
| | | Cross-linked rubber 2 | | 10 | | | | | | |
| | Lubricant | Lubricant 1 | | | | | | 0.6 | | |
| | Filler | Inorganic filer 1 | | | | | | 1.6 | | |
| Evaluation results | Hardness (JIS-A) | | 28 | 57 | 59 | 42 | 46 | 45 | 62 | 30 |
| | Tensile properties | Strength at break (MPa) | 9.8 | 8.3 | 8.7 | 5.3 | 4.6 | 11.2 | 10 | 5 |
| | | Elongation at break (%) | 276 | 238 | 200 | 230 | 220 | 295 | 255 | 325 |
| | Oil resistance | Rate or weight change wt % | 20.3 | 15.2 | 22.1 | 40 | 47 | 17.6 | 16.9 | 19.4 |
| | | Shape after immersion | ○ | ○ | ○ | ○ | ○ | ○ | ○ | ○ |
| | Low-temperature brittleness | Brittle temperature (° C.) | −29.4 | −25.5 | −26.5 | −35.5 | — | −25.7 | −20.5 | −21.4 |
| | Compression set | 100° C., 22 Hr (%) | 60 | 50.7 | 49.2 | 38.1 | 34.1 | 57 | 49.3 | 44 |

(*)parts

Table 7 shows the test results of Examples 31 to 35 and Examples 7B, 13B, and 15B. The results shown in Table 7 indicate that in Examples 31 to 35, a molded product having desired flexibility, compression set, oil resistance, and tensile properties can be obtained even when cross-linked rubber is added. It is also found that by adding cross-linked rubber having low Tg, the low-temperature brittleness can be improved without deterioration in oil resistance.

<Filler-containing Composition>

EXAMPLE 36

First, 5 parts by weight of a lubricant 1 (stearic acid, produced by Nacalai Tesque) and 0.25 parts by weight of an inorganic filler 1 (carbon black, produced by Asahi Carbon Co., Ltd., Asahi #15) were added to 100 parts by weight of the carboxyl-containing block copolymer 20C3A6, and the resultant mixture was kneaded for 10 minutes with Labo

EXAMPLE 38

Molded products were formed by the same method as in Example 36 except that 2 parts by weight of a lubricant 2 (zinc stearate, produced by NOF Corporation) and 10 parts by weight of an inorganic filler 2 (carbon black, produced by Asahi Carbon Co., Ltd., Asahi #60HN) were added to 100 parts by weight of the carboxyl-containing block copolymer 20C3A6.

EXAMPLE 39

Molded products were formed by the same method as in Example 36 except that 5 parts by weight of a lubricant 3 (calcium stearate, produced by Sakai Chemical Co., Ltd., SC-100) and 0.25 parts by weight of an inorganic filler 2 (carbon black, produced by Asahi Carbon Co., Ltd., Asahi

60HN) were added to 100 parts by weight of the carboxyl-containing block copolymer 20C3A6.

COMPARATIVE EXAMPLES 1B and 2B

The molded sheet products of 2 mm in thickness formed by heat pressing in Comparative Examples 1 and 2 were used for evaluating frictionality. The levels of frictionality of these products could not be measured because of high tackiness.

EXAMPLE 13C

The molded sheet product of 2 mm in thickness formed by heat pressing in Example 13B was used for evaluating frictionality. The molded sheet product was finely cut into pellets for measuring the processing temperature.

EXAMPLE 40

First, 25 parts by weight of a plasticizer (polybutyl acrylate, produced by Toa Gosei Co., Ltd., UP-1000), 3 parts by weight of a lubricant 2 (zinc stearate, produced by Sakai Chemical Co., Ltd., SZ-2000), and 15 parts by weight of an inorganic filler 2 (carbon black, produced by Asahi Carbon Co., Ltd., Asahi #60HN) were added to 100 parts by weight of the carboxyl-containing block copolymer 20C3A6, and the resultant mixture was kneaded for 10 minutes by Labo Plastomill (produced by Toyo Seiki Co., Ltd.) set at 180° C. at a rotational speed of 100 rpm to obtain a bulk sample. The resultant composition was heat-pressed at 180° C. to obtain a cylindrical molded product of 30 mm in diameter and 12 mm in thickness. The molded product was used for evaluating hardness and compression set. Similarly, the composition was heat-pressed to obtain a molded sheet product of 2 mm in thickness. The molded sheet product was used for measuring oil resistance and tensile properties. As a result, it was found that a molded product having desired flexibility, compression set, oil resistance, and tensile properties could be obtained even by adding a plasticizer.

TABLE 8

| | | | Example No. | | | | Comp. Example | | | |
|---|---|---|---|---|---|---|---|---|---|---|
| | | | 36 | 37 | 38 | 39 | 1B | 2B | 13C | 40 |
| Compositon(*) | Block copolymer | 20C3A6 | 100 | | 100 | 100 | | | 100 | 100 |
| | | 20AN3A6 | | 100 | | | | | | |
| | | BA-7 | | | | | 100 | | | |
| | | 3A-7 | | | | | | 100 | | |
| | Filler | Lubricant 1 | 5 | 20 | | | | | | |
| | | Lubricant 2 | | | 2 | | | | | 3 |
| | | Lubricant 3 | | | | 5 | | | | |
| | | Inorganic filler 1 | 0.25 | 1.25 | | | | | | |
| | | Inorganic filler 2 | | | 10 | 0.25 | | | | 15 |
| | Plasticizer | | | | | | | | | 25 |
| Evaluation results | Hardness (JIS-A) | | 71 | 72 | 88 | 69 | 22 | 38 | 62 | 40 |
| | Tensile properties | Strength at break (MPa) | 8 | 8 | 9 | 7 | 8.6 | 6.6 | 10 | 4 |
| | | Elongation at break (%) | 220 | 277 | 157 | 215 | 339 | 621 | 255 | 155 |
| | Oil resistance | Rate of weight change (wt %) | 11.2 | 3.7 | 14.9 | 12.7 | 54.9 | 21 | 16.9 | 5 |
| | | Shape after immersion | ○ | ○ | ○ | ○ | x | ○ | ○ | ○ |
| | Frictionality | Dynamic coefficient of friction | 7.2 | 1.5 | 26 | 6.2 | x | x | x | — |
| | Compression set | 70° C., 22 Hr (%) | | | | | 49 | 76 | | |
| | | 100° C. 22 Hr (%) | 53 | 56 | 62.5 | 49 | | | 49.3 | 62.1 |
| | | 120° C., 22 Hr (%) | | | | | | | | |
| | Processability | Processing temp. (° C.) (melt viscosity 1500 poise) | 175 | — | — | — | | | 200 | — |

(*)parts

Table 8 shows the test result of Examples 36 to 40, Comparative Examples 1B and 2B, and Example 13C. The results shown in Table 8 indicate that the compositions containing the acrylic block copolymer of the present invention, the lubricant, and the inorganic filler exhibit desired flexibility, oil resistance, compression set, and tensile properties, and low dynamic frictionality at resin surfaces.

Comparison between Examples 36 and 13C shows that the processing temperature can be decreased by adding the lubricant and the inorganic filler to the acrylic block copolymer of the present invention, and thus satisfactory molding can be performed in injection molding or the like.

<Compatibilizer>

EXAMPLE 41

First, 25 parts by weight of UBESTA 3012U (Ube Industries, Ltd.) and 4 parts by weight of 20ANBA7 were added to 100 parts by weight of BA7, and the resultant mixture was kneaded for 20 minutes with Labo Plastomill set at 240° C. at a rotational speed of 100 rpm to obtain a bulk sample. The resultant sample was heat-pressed at 240° C. to obtain a molded product of 2 mm in thickness for evaluating physical properties. A test piece with a predetermined shape was punched from the molded product and used for evaluating each of the physical properties.

COMPARATIVE EXAMPLE 16

First, 25 parts by weight of UBESTA 3012U (Ube Industries, Ltd.) was added to 100 parts by weight of BA7, and the resultant mixture was kneaded for 20 minutes by Labo Plastomill set at 240° C. at a rotational speed of 100 rpm to obtain a bulk sample. The resultant sample was heat-pressed at 240° C. to obtain a molded product of 2 mm in thickness for evaluating physical properties. A test piece with a predetermined shape was punched from the molded product and used for evaluating each of the physical properties.

TABLE 9

|  | Example 41 | Comparative Example 16 |
|---|---|---|
| Polymer | BA7 | BA7 |
| Thermoplastic resin | 3012U | 3012U |
| Compatibilizer | 20ANBA7 | — |
| Strength at break (MPa) | 5.29 | 6.27 |
| Elongation at break (%) | 295.2 | 226 |

Table 9 shows the test results of Example 41 and Comparative Example 16. Table 9 indicates that according to the present invention, the composition containing the acid anhydride group-containing block copolymer has an improved elongation at break, and thus desirably acts as the compatibilizer between UBESTA 3012U and BA7.

These results indicate that the acrylic block copolymer of the present invention is rich in flexibility and excellent in mechanical strength, moldability, oil resistance, heat resistance, and thermal decomposition resistance, and is further rich in reactivity. It is also found that a novel composition rich in flexibility, oil resistance, and heat resistance can be obtained by combining the acrylic block copolymer of the present invention with the rubber or the thermoplastic resin and/or the thermoplastic elastomer. It is further found that the acrylic block copolymer of the present invention can be preferably widely used for automobile, electric, and electronic parts because of excellent oil resistance, heat resistance, and compression set.

INDUSTRIAL APPLICABILITY

The acrylic block copolymer of the present invention is rich in flexibility and excellent in mechanical strength, moldability, oil resistance, heat resistance, thermal decomposition resistance, and weather resistance, and is further rich in reactivity. Therefore, the acrylic block copolymer of the present invention can be preferably used as a novel thermoplastic elastomer, a compatibilizer, and the like. By utilizing these characteristics, the novel acrylic block copolymer of the present invention and a composition containing the block copolymer can be preferably widely used for automobile, electric, and electronic parts (for example, seal products for automobiles, seal products for home electric appliances, and seal products for office electric appliances).

The invention claimed is:

1. An acrylic block copolymer (A) comprising a methacrylic polymer block (a) and an acrylic polymer block (b), wherein at least one of the polymer blocks contains, in its main chain, at least one acid anhydride group (c) represented by formula (1):

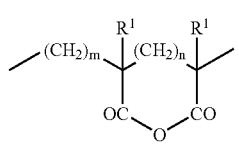

(1)

(in which $R^1$'s each represent hydrogen or a methyl group and may be the same or different, n represents an integer of 1 to 3, and m represents an integer of 0 or 1), wherein the acrylic block copolymer contains 0.1% by weight to 99.9% by weight of the acid anhydride group (c), wherein the number-average molecular weight of the acrylic block copolymer is 30,000 to 500,000, wherein the ratio (Mw/Mn) of the weight average molecular weight (Mw) to the number-average molecular weight (Mn) according to gel permeation chromatographic measurement is 1 to 1.8, and wherein the acrylic polymer block (b) comprises n-butyl acrylate, ethyl acrylate, and 2-methoxyethyl acrylate.

2. An acrylic block copolymer (A) comprising a methacrylic polymer block (a) and an acrylic polymer block (b), wherein at least one of the polymer blocks contains, in its main chain, at least one acid anhydride group (c) represented by formula (1):

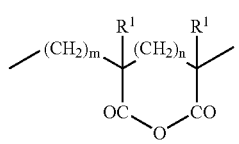

(1)

(in which $R^1$'s each represent hydrogen or a methyl group and may be the same or different, n represents an integer of 1 to 3, and m represents an integer of 0 or 1), wherein the acrylic block copolymer contains 0.1% by weight to 99.9% by weight of the acid anhydride group (c), wherein the number-average molecular weight of the acrylic block copolymer is 30,000 to 500,000, wherein the ratio (Mw/Mn) of the weight average molecular weight (Mw) to the number-average molecular weight (Mn) according to gel permeation chromatographic measurement is 1 to 1.8, and wherein the acrylic polymer block (b) comprises n-butyl acrylate and 2-methoxyethyl acrylate.

3. The acrylic block copolymer according to claim 1 or claim 2, wherein the acrylic block copolymer is at least one type selected from the group consisting of (a-b)$_n$, b-(a-b)$_n$, and (a-b)$_n$-a.

4. The acrylic block copolymer according to claim 1 or claim 2, comprising 5% by weight to 80% by weight of the methacrylic polymer block (a) and 95% by weight to 20% by weight of the acrylic polymer block (b).

5. The acrylic block copolymer according to claim 1 or claim 2, wherein the methacrylic polymer block (a) contains the acid anhydride group (c).

6. The acrylic block copolymer according to claim 1 or claim 2, wherein the acrylic polymer block (b) contains the acid anhydride group (c).

7. The acrylic block copolymer according to claim 1 or claim 2, wherein the carboxyl group (d) is contained in the block containing the acid anhydride group (c).

8. The acrylic block copolymer according to claim 1 or claim 2, containing a carboxyl group (e) produced in its side chains by hydrolytic ring opening of the acid anhydride group.

9. The acrylic block copolymer according to claim 1 or claim 2, wherein the acrylic block copolymer is produced by atom transfer radical polymerization.

10. The acrylic block copolymer according to claim 1 or claim 2, containing 0.1% by weight to 50% by weight of a carboxyl group (d).

* * * * *